(12) United States Patent
Hua et al.

(10) Patent No.: US 12,452,844 B2
(45) Date of Patent: Oct. 21, 2025

(54) COMMUNICATION METHOD AND APPARATUS FOR TRANSMITTING MORE PDCCHs AND IMPROVING RESOURCE USAGE

(71) Applicant: HUAWEI TECHNOLOGIES CO., LTD., Guangdong (CN)

(72) Inventors: Meng Hua, Shanghai (CN); Yi Long, Beijing (CN); Jinlin Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 439 days.

(21) Appl. No.: 18/045,823

(22) Filed: Oct. 11, 2022

(65) Prior Publication Data

US 2023/0056664 A1 Feb. 23, 2023

Related U.S. Application Data

(63) Continuation of application No. PCT/CN2021/086280, filed on Apr. 9, 2021.

(30) Foreign Application Priority Data

Apr. 17, 2020 (CN) .......................... 202010308056.9

(51) Int. Cl.
*H04W 72/04* (2023.01)
*H04W 72/044* (2023.01)
*H04W 72/23* (2023.01)

(52) U.S. Cl.
CPC ......... *H04W 72/044* (2013.01); *H04W 72/23* (2023.01)

(58) Field of Classification Search
CPC .......................... H04W 72/044; H04W 72/23
See application file for complete search history.

(56) References Cited

U.S. PATENT DOCUMENTS

2018/0227939 A1\* 8/2018 Bagheri ............ H04W 72/1268
2019/0132866 A1\* 5/2019 Goto .......................... H04L 5/00
(Continued)

FOREIGN PATENT DOCUMENTS

| CN | 110351041 A | 10/2019 |
| CN | 110474731 A | 11/2019 |

OTHER PUBLICATIONS

"Remaining aspects for rate matching" Busan, South Korea; May 24, 2018 (Year: 2018).\*

(Continued)

*Primary Examiner* — Mewale A Ambaye

(57) ABSTRACT

A communication method and apparatus are provided. The communication method includes: A terminal receives, from a network device, configuration information indicating a first time-frequency resource and downlink control information indicating a second time-frequency resource. The first time-frequency resource cannot be used to transmit a downlink data channel and a demodulation reference signal for the downlink data channel, and the second time-frequency resource includes a resource used to transmit the downlink data channel and the demodulation reference signal for the downlink data channel. When determining that a time domain resource of the first time-frequency resource includes a time domain resource of the second time-frequency resource, the terminal receives the downlink data channel and the demodulation reference signal for the downlink data channel on a third time-frequency resource.

20 Claims, 11 Drawing Sheets

(56) References Cited

U.S. PATENT DOCUMENTS

2019/0349142 A1* 11/2019 Aiba .................. H04L 1/1819
2020/0022168 A1    1/2020 Xu et al.
2021/0314955 A1* 10/2021 Zhang ................ H04W 72/53
2022/0239454 A1*  7/2022 Liao ................ H04W 72/1273

OTHER PUBLICATIONS

Summary of open issues related to rate-matching in NR (Year: 2018).*

R1-1910417, Huawei et al., Discussion on conditions of rate matching pattern overlapping with PDSCH DMRS symbols, 3GPP TSG RAN WG1 Meeting #98bis, Chongqing, China, Oct. 14-20, 2019, 6 pages.

3GPP TS 38.214 V16.1.0 (Mar. 2020), 3rd Generation Partnership Project; Technical Specification Group Radio Access Network;NR;Physical layer procedures for data(Release 16), 151 pages.

Nokia et al:"Summary of open issues related to rate-matching in NR" 3GPP Draft;R1-1807635 (May 24, 2018) XP051463272 tatal:10pages.

ZTE:"Remaining aspects for rate matching" 3GPP Draft; R1 1806136,May 20, 2018 (May 20, 2018) XP051441346,total:3pages.

Etsi: 5G; NR; Physical layer procedures for data (3GPP TS 38 .214 version 15 .8 .0 Release 15) Physical layer procedures for data(3GPP TS38 .214 version 15 .8 .0 Release 15) Jan. 1, 2020 (Jan. 1, 2020) pp. 1-109, XP055830791 total:109pages.

* cited by examiner

COMMUNICATION METHOD AND APPARATUS FOR TRANSMITTING MORE PDCCHs AND IMPROVING RESOURCE USAGE

CROSS-REFERENCE TO RELATED APPLICATIONS

This application is a continuation of International Application No. PCT/CN2021/086280, filed on Apr. 9, 2021, which claims priority to Chinese Patent Application No. 202010308056.9, filed on Apr. 17, 2020. The aforementioned applications are hereby incorporated by reference in their entireties.

TECHNICAL FIELD

This application relates to the field of communication technologies, and in particular, to a communication method and apparatus.

BACKGROUND

In a communication system, a network side device may send downlink control information (DCI) to a terminal side device on a physical downlink control channel (PDCCH). The DCI may include information such as uplink scheduling information used to schedule the terminal side device to transmit data on a physical uplink shared channel (PUSCH) or downlink scheduling information used to schedule the terminal side device to receive a physical downlink shared channel (PDSCH).

In a new radio system, a resource that cannot be used to send a PDSCH is defined, and the resource is also referred to as a rate matching resource. To reduce complexity of channel estimation of the terminal side device, the existing protocol specifies that a rate matching resource cannot overlap a demodulation reference signal (DM-RS) resource of a PDSCH. Generally, a DM-RS resource that cannot be used to transmit a PDSCH cannot be used to transmit a PDCCH. If a PDCCH candidate resource overlaps a rate matching resource, the terminal side device does not detect the PDCCH candidate resource.

However, a rate matching resource that cannot be used to transmit a PDSCH may include a resource used to transmit a PDCCH. Complied with the existing protocol, that is, a PDCCH candidate resource overlaps a rate matching resource, the terminal side device does not detect the PDCCH candidate resource. Consequently, fewer PDCCHs are transmitted, and resource usage is low.

SUMMARY

This application provides a communication method and apparatus, to transmit more PDCCHs and improve resource usage.

According to a first aspect, an embodiment of this application provides a communication method. The method may be performed by a first communication apparatus. The first communication apparatus may be a terminal or a communication apparatus, for example, a chip system, that can support the terminal to implement a function required by the method. The following is described by using an example in which the first communication apparatus is a terminal. The method includes:

receiving configuration information from a network device, where the configuration information includes first frequency domain resource indication information, the first frequency domain resource indication information indicates a frequency domain resource of a first time-frequency resource, and the first time-frequency resource cannot be used to transmit a downlink data channel and a demodulation reference signal for the downlink data channel;

receiving downlink control information from the network device, where the downlink control information includes second frequency domain resource indication information and second time domain resource indication information, the second frequency domain resource indication information indicates a frequency domain resource of a second time-frequency resource, the second time domain resource indication information indicates a time domain resource of the second time-frequency resource, and the second time-frequency resource includes a resource used to transmit the downlink data channel and the demodulation reference signal for the downlink data channel;

determining that a time domain resource of the first time-frequency resource includes the time domain resource indicated by the second time domain resource indication information; and receiving, on a portion of or all of a third time-frequency resource, the downlink data channel and the demodulation reference signal for the downlink data channel from the network device, where the third time-frequency resource is located in the second time-frequency resource, and the third time-frequency resource does not overlap the first time-frequency resource.

In this embodiment of this application, the resource (namely, the first time-frequency resource) that cannot be used to transmit the downlink data channel and the demodulation reference signal for the downlink data channel can overlap the resource, indicated by the second frequency domain resource indication information, of the demodulation reference signal for the downlink data channel. Therefore, when the first time-frequency resource overlaps the second time-frequency resource, the terminal may receive the downlink data channel and the demodulation reference signal for the downlink data channel on the third time-frequency resource in the second time-frequency resource. Because the third time-frequency resource does not overlap the first time-frequency resource, complexity of channel estimation of the terminal can be reduced. For example, a PDCCH may be received on a resource other than the third time-frequency resource in the second time-frequency resource, namely, a portion of the first time-frequency resource, to transmit more PDCCHs as much as possible. For example, the first time-frequency resource may include a time-frequency resource used to carry a synchronization broadcast block.

In an embodiment, the first time-frequency resource is allowed to overlap a resource, in the second time-frequency resource, that is of the demodulation reference signal for the downlink data channel and that is indicated by the second frequency domain resource indication information, and the resource that is allowed to overlap is not used to transmit the demodulation reference signal for the downlink data channel.

It should be understood that the resource (namely, the first time-frequency resource) that cannot be used to transmit the downlink data channel and the demodulation reference signal for the downlink data channel is allowed to overlap the resource, in the second time-frequency resource, that is of the demodulation reference signal for the downlink data channel and that is indicated by the second frequency domain resource indication information. This means that the demodulation reference signal for the downlink data channel is not transmitted on the first time-frequency resource and the resource overlapping the resource, in the second time-frequency resource, that is of the demodulation reference signal for the downlink data channel and that is indicated by the second frequency domain resource indication information.

In an embodiment, the configuration information further includes a first parameter, the first parameter indicates a time domain resource, and the method further includes:

determining not to monitor a downlink control channel candidate; or determining that a downlink control channel detected on a downlink control channel candidate is invalid.

The downlink control channel candidate overlaps a fourth time-frequency resource, a frequency domain resource of the fourth time-frequency resource is a frequency domain resource indicated by a first frequency domain resource, and a time domain resource of the fourth time-frequency resource is the time domain resource indicated by the first parameter.

In this solution, the network device indicates, to the terminal by using the configuration information, a time domain resource, namely, the fourth time-frequency resource, located in the first frequency domain resource. The fourth time-frequency resource may be considered as a resource that cannot be used to transmit the downlink control channel. If the fourth time-frequency resource overlaps the downlink control channel candidate, the terminal may determine not to monitor the downlink control channel candidate, or determine that the downlink control channel detected on the downlink control channel candidate is invalid. Because the fourth time-frequency resource is less than or equal to the first time-frequency resource, more downlink control channels may be transmitted as much as possible.

In an embodiment, the first time-frequency resource belongs to resources of a group of rate matching patterns, and the resources of a group of rate matching patterns are resources, indicated by the downlink control information, that cannot be used to transmit the downlink data channel.

In this solution, a base station may place the first time-frequency resource in a rate matching pattern group, and indicate, by using downlink control information, whether a resource of the rate matching pattern group can be used to transmit the downlink data channel, that is, dynamically configure the first time-frequency resource.

According to a second aspect, an embodiment of this application provides another communication method. The method may be performed by a first communication apparatus. The first communication apparatus may be a terminal or a communication apparatus, for example, a chip system, that can support the terminal to implement a function required by the method. The following is described by using an example in which the first communication apparatus is a terminal. The method includes:

receiving configuration information from a network device, where the configuration information indicates a first time-frequency resource, and the first time-frequency resource cannot be used to transmit a downlink data channel;

determining that the first time-frequency resource belongs to a first-type time-frequency resource or a second-type time-frequency resource; and if the first time-frequency resource belongs to the first-type time-frequency resource, determining not to monitor a downlink control channel candidate, or determining that a downlink control channel detected on a downlink control channel candidate is invalid, where the downlink control channel candidate overlaps the first time-frequency resource; or if the first time-frequency resource belongs to the second-type time-frequency resource, monitoring at least one downlink control channel candidate, or determining that a downlink control channel detected on at least one downlink control channel candidate is valid, where the at least one downlink control channel candidate overlaps the first time-frequency resource.

In this solution, a rate matching resource is classified. For example, if the first time-frequency resource is not allowed to overlap a resource, in a second time-frequency resource, that is of a demodulation reference signal for the downlink data channel and that is indicated by frequency domain resource indication information, it may be considered that the first time-frequency resource belongs to the first-type time-frequency resource. If the first time-frequency resource is allowed to overlap the resource, in the second time-frequency resource, that is of the demodulation reference signal for the downlink data channel and that is indicated by the frequency domain resource indication information, it may be considered that the first time-frequency resource belongs to the second-type time-frequency resource. A frequency domain resource of the second time-frequency resource is indicated by the frequency domain resource indication information in the downlink control channel, and a time domain resource of the second time-frequency resource is indicated by time domain resource indication information in the downlink control channel. When determining that the first time-frequency resource belongs to the first-type time-frequency resource, the terminal may not monitor the downlink control channel candidate overlapping the first time-frequency resource. On the contrary, when determining that the first time-frequency resource belongs to the second-type time-frequency resource, the terminal may monitor the at least one downlink control channel candidate overlapping the first time-frequency resource, to transmit more PDCCHs as much as possible and improve resource usage.

For example, the first time-frequency resource includes a time-frequency resource used to carry a synchronization broadcast block.

In some embodiments, that the terminal determines that the first time-frequency resource is the first-type time-frequency resource includes:

if it is determined that the first time-frequency resource is not allowed to overlap the resource, in the second time-frequency resource, that is of the demodulation reference signal for the downlink data channel and that is indicated by the frequency domain resource indication information, determining that the first time-frequency resource belongs to the first-type time-frequency resource, where the second time-frequency resource includes a resource used to transmit the downlink data channel and the demodulation reference signal for the downlink data channel.

Correspondingly, if the first time-frequency resource is allowed to overlap the resource, in the second time-frequency resource, that is of the demodulation reference signal for the downlink data channel and that is indicated by the frequency domain resource indication information, and the resource that is allowed to overlap is not used to transmit the demodulation reference signal for the downlink data channel, the terminal determines that the first time-frequency resource belongs to the second-type time-frequency resource. The second time-frequency resource includes the resource used to transmit the downlink data channel and the demodulation reference signal for the downlink data channel, the frequency domain resource of the second time-frequency resource is indicated by second frequency domain resource indication information in the downlink control channel, and the time domain resource of the second time-frequency resource is indicated by second time domain resource indication information in the downlink control channel.

In this solution, the first-type time-frequency resource is a resource that is not allowed to overlap the resource, in the second time-frequency resource, that is of the demodulation reference signal for the downlink data channel and that is indicated by the second frequency domain resource indication information in the downlink control channel. The second-type time-frequency resource is a resource that is allowed to overlap the resource, in the second time-frequency resource, that is of the demodulation reference signal for the downlink data channel and that is indicated by the second frequency domain resource indication information in the downlink control channel.

In some other embodiments, the first-type time-frequency resource is a resource that is not allowed to overlap the resource, in the second time-frequency resource, that is of the demodulation reference signal for the downlink data channel and that is indicated by the second frequency domain resource indication information in the downlink control channel, or a resource that is allowed to overlap the resource, in the second time-frequency resource, that is of the demodulation reference signal for the downlink data channel and that is indicated by the second frequency domain resource indication information in the downlink control channel. The second-type time-frequency resource is a resource that is allowed to overlap the resource, in the second time-frequency resource, that is of the demodulation reference signal for the downlink data channel and that is indicated by the second frequency domain resource indication information in the downlink control channel. The resource that is allowed to overlap the resource, in the second time-frequency resource, that is of the demodulation reference signal for the downlink data channel and that is indicated by the second frequency domain resource indication information in the downlink control channel may belong to the first-type time-frequency resource or the second-type time-frequency resource. Therefore, the terminal may determine, based on an indication of the network device, that the first time-frequency resource belongs to the first-type time-frequency resource or the second-type time-frequency resource.

For example, that the terminal determines that the first time-frequency resource belongs to the first-type time-frequency resource or the second-type time-frequency resource includes:

The terminal receives indication information from the network device, where the indication information indicates that the first time-frequency resource belongs to the first-type time-frequency resource or the second-type time-frequency resource.

The terminal determines, based on the indication information, that the first time-frequency resource belongs to the first-type time-frequency resource or the second-type time-frequency resource.

In an embodiment, the first time-frequency resource belongs to resources of a group of rate matching patterns, and the resources of a group of rate matching patterns are resources, indicated by the downlink control information, that cannot be used to transmit the downlink data channel.

In this solution, a base station may place the first time-frequency resource in a rate matching pattern group, indicate, by using downlink control information, whether a resource of the rate matching pattern group can be used to transmit the downlink data channel, and configure the first time-frequency resource for the terminal, that is, dynamically configure the first time-frequency resource.

According to a third aspect, an embodiment of this application provides still another communication method. The method may be performed by a first communication apparatus. The first communication apparatus may be a terminal or a communication apparatus, for example, a chip system, that can support the terminal to implement a function required by the method. The following is described by using an example in which the first communication apparatus is a terminal. The method includes:

receiving configuration information from a network device, where the configuration information indicates a first time-frequency resource, and the first time-frequency resource cannot be used to transmit a downlink data channel and a demodulation reference signal for the downlink data channel; and if indication information from the network device is received, determining to monitor at least one first downlink control channel candidate, or determining that a downlink control channel detected on at least one first downlink control channel candidate is valid, where the at least one first downlink control channel candidate overlaps the first time-frequency resource; or if indication information from the network device is not received, determining not to monitor a first downlink control channel candidate, or determining that a downlink control channel detected on a first downlink control channel candidate is invalid, where the first downlink control channel candidate overlaps the first time-frequency resource.

The indication information indicates to monitor the first downlink control channel candidate, or that the downlink control channel detected on the first downlink control channel candidate is valid.

This solution is different from the solution in the second aspect. Instead of performing determining independently, the terminal may determine, based on the indication of the network device, whether to monitor the at least one first downlink control channel candidate, or determine whether the downlink control channel detected on the at least one first downlink control channel candidate is valid. This can reduce complexity of the terminal.

In an embodiment, the first time-frequency resource is allowed to overlap a resource, in a second time-frequency resource, that is of the demodulation reference signal for the downlink data channel and that is indicated by frequency domain resource indication information, and the resource that is allowed to overlap is not used to transmit the downlink data channel and the demodulation reference signal for the downlink data channel. The second time-frequency resource includes a resource used to transmit the downlink data channel and the demodulation reference signal for the downlink data channel, a frequency domain resource of the second time-frequency resource is indicated by the frequency domain resource indication information in the downlink control channel, and a time domain resource of the second time-frequency resource is indicated by time domain resource indication information in the downlink control channel.

It should be understood that the resource (namely, the first time-frequency resource) that cannot be used to transmit the downlink data channel and the demodulation reference signal for the downlink data channel is allowed to overlap the resource used to transmit the demodulation reference signal for the downlink data channel. This means that the downlink data channel and the demodulation reference signal for the downlink data channel is not transmitted on the first time-frequency resource and the resource overlapping the resource, in the second time-frequency resource, that is of the demodulation reference signal for the downlink data channel and that is indicated by the frequency domain resource indication information.

According to a fourth aspect, an embodiment of this application provides yet another communication method. The method may be performed by a first communication apparatus. The first communication apparatus may be a terminal or a communication apparatus, for example, a chip system, that can support the terminal to implement a function required by the method. The following is described by using an example in which the first communication apparatus is a terminal. The method includes:

receiving configuration information from a network device, where the configuration information indicates a first time-frequency resource, and the first time-frequency resource cannot be used to transmit a downlink data channel and a demodulation reference signal for the downlink data channel; and receiving indication information from the network device, where the indication information indicates whether at least one first downlink control channel candidate associated with a first control channel resource set or in a first search space set is monitored, or whether a downlink control channel detected on at least one first downlink control channel candidate associated with a first control channel resource set or in a first search space set is valid, and the at least one first downlink control channel candidate overlaps the first time-frequency resource.

This solution is an alternative to the solution in the third aspect. Instead of performing determining independently may determine, based on the indication information of the network device, whether to monitor the at least one first downlink control channel candidate, or determine whether the downlink control channel detected on the at least one first downlink control channel candidate is valid. This can reduce complexity of the terminal.

In an embodiment, the first time-frequency resource overlaps a resource, in a second time-frequency resource, that is of the demodulation reference signal for the downlink data channel and that is indicated by frequency domain resource indication information, and the overlapped resource is not used to transmit the downlink data channel and the demodulation reference signal for the downlink data channel. The second time-frequency resource includes a resource used to transmit the downlink data channel and the demodulation reference signal for the downlink data channel, a frequency domain resource of the second time-frequency resource is indicated by the frequency domain resource indication information in the downlink control channel, and a time domain resource of the second time-frequency resource is indicated by time domain resource indication information in the downlink control channel.

According to a fifth aspect, an embodiment of this application provides a communication method. The method may be performed by a second communication apparatus. The second communication apparatus may be a network device or a communication apparatus, for example, a chip system, that can support the network device to implement a function required by the method. The following is described by using an example in which the second communication apparatus is a network device. The method includes:

sending configuration information to a terminal, where the configuration information indicates a first time-frequency resource, and the first time-frequency resource cannot be used to transmit a downlink data channel;

determining that the first time-frequency resource belongs to a first-type time-frequency resource or a second-type time-frequency resource, where the first time-frequency resource is allowed to overlap a resource, in a second time-frequency resource, that is of a demodulation reference signal for the downlink data channel and that is indicated by frequency domain resource indication information, the resource that is allowed to overlap is not used to transmit the demodulation reference signal for the downlink data channel, the second time-frequency resource includes a resource used to transmit the downlink data channel and the demodulation reference signal for the downlink data channel, a frequency domain resource of the second time-frequency resource is indicated by the frequency domain resource indication information in a downlink control channel, and a time domain resource of the second time-frequency resource is indicated by time domain resource indication information in the downlink control channel;

sending indication information to the terminal, where the indication information indicates that the first time-frequency resource belongs to the first-type time-frequency resource or the second-type time-frequency resource; and if the first time-frequency resource belongs to the first-type time-frequency resource, skipping sending, by a base station, the downlink control channel on a downlink control channel candidate, where the downlink control channel candidate overlaps the first time-frequency resource; or if the first time-frequency resource belongs to the second-type time-frequency resource, sending, by the base station, the downlink control channel on a downlink control channel candidate, where the downlink control channel candidate overlaps the first time-frequency resource.

In an embodiment, the first time-frequency resource is not allowed to overlap the resource, in the second time-frequency resource, that is of the demodulation reference signal for the downlink data channel and that is indicated by the frequency domain resource indication information, and the first time-frequency resource belongs to the first-type time-frequency resource.

For technical effects brought by the fifth aspect or the implementations of the fifth aspect, refer to descriptions of technical effects brought by the second aspect or the implementations of the second aspect.

According to a sixth aspect, a communication apparatus is provided. For technical effects, refer to descriptions in the first aspect. Details are not described herein again. The communication apparatus has a function of implementing behavior in the method embodiments in the first aspect. The function may be implemented by hardware, or may be implemented by hardware executing corresponding software. The hardware or the software includes one or more modules corresponding to the foregoing function. In an embodiment, the communication apparatus includes a processing module and a transceiver module.

The transceiver module is configured to receive configuration information from a network device. The configuration information includes first frequency domain resource indication information, the first frequency domain resource indication information indicates a frequency domain resource of a first time-frequency resource, and the first time-frequency resource cannot be used to transmit a downlink data channel and a demodulation reference signal for the downlink data channel.

The transceiver module is further configured to receive downlink control information from the network device, where the downlink control information includes second frequency domain resource indication information and second time domain resource indication information, the second frequency domain resource indication information indicates a frequency domain resource of a second time-frequency resource, the second time domain resource indication information indicates a time domain resource of the second time-frequency resource, and the second time-frequency resource includes a resource used to transmit the downlink data channel and the demodulation reference signal for the downlink data channel.

The processing module is configured to determine that a time domain resource of the first time-frequency resource includes the time domain resource indicated by the second time domain resource indication information.

The transceiver module is further configured to receive, on a portion of or all of a third time-frequency resource, the downlink data channel and the demodulation reference signal for the downlink data channel from the network device, where the third time-frequency resource is located in the second time-frequency resource, and the third time-frequency resource does not overlap the first time-frequency resource.

In an embodiment, the first time-frequency resource is allowed to overlap a resource, in the second time-frequency resource, that is of the demodulation reference signal for the downlink data channel and that is indicated by the second frequency domain resource indication information, and the resource that is allowed to overlap is not used to transmit the downlink data channel and the demodulation reference signal for the downlink data channel.

In an embodiment, the configuration information further includes a first parameter, the first parameter indicates a time domain resource, and the processing module is further configured to:
determine not to monitor a downlink control channel candidate; or
determine that a downlink control channel detected on a downlink control channel candidate is invalid.

The downlink control channel candidate overlaps a fourth time-frequency resource, a frequency domain resource of the fourth time-frequency resource is a frequency domain resource indicated by a first frequency domain resource, and a time domain resource of the fourth time-frequency resource is the time domain resource indicated by the first parameter.

In an embodiment, the first time-frequency resource belongs to resources of a group of rate matching patterns, and the resources of a group of rate matching patterns are resources, indicated by the downlink control information, that cannot be used to transmit the downlink data channel.

In an embodiment, the first time-frequency resource includes a time-frequency resource used to carry a synchronization broadcast block.

For technical effects brought by the sixth aspect or the implementations of the sixth aspect, refer to descriptions of technical effects brought by the first aspect or the implementations of the first aspect.

According to a seventh aspect, a communication apparatus is provided. The communication apparatus has a function of implementing behavior in the method embodiments in the second aspect. The function may be implemented by hardware, or may be implemented by hardware executing corresponding software. The hardware or the software includes one or more modules corresponding to the foregoing function. In an embodiment, the communication apparatus includes a processing module and a transceiver module.

The transceiver module is configured to receive configuration information from a network device, where the configuration information indicates a first time-frequency resource, and the first time-frequency resource cannot be used to transmit a downlink data channel.

The processing module is configured to: determine that the first time-frequency resource belongs to a first-type time-frequency resource or a second-type time-frequency resource; and
if the first time-frequency resource belongs to the first-type time-frequency resource, determine not to monitor a downlink control channel candidate, or determine that a downlink control channel detected on a downlink control channel candidate is invalid, where the downlink control channel candidate overlaps the first time-frequency resource; or
if the first time-frequency resource belongs to the second-type time-frequency resource, monitor at least one downlink control channel candidate, or determine that a downlink control channel detected on at least one downlink control channel candidate is valid, where the at least one downlink control channel candidate overlaps the first time-frequency resource.

In an embodiment, the processing module is configured to:
if it is determined that the first time-frequency resource is not allowed to overlap a resource, in a second time-frequency resource, that is of a demodulation reference signal for the downlink data channel and that is indicated by frequency domain resource indication information, determine that the first time-frequency resource belongs to the first-type time-frequency resource, where the second time-frequency resource includes a resource used to transmit the downlink data channel and the demodulation reference signal for the downlink data channel, a frequency domain resource of the second time-frequency resource is indicated by the frequency domain resource indication information in the downlink control channel, and a time domain resource of the second time-frequency resource is indicated by time domain resource indication information in the downlink control channel.

In an embodiment, the processing module is configured to:
if it is determined that the first time-frequency resource is allowed to overlap the resource, in the second time-frequency resource, that is of the demodulation reference signal for the downlink data channel and that is indicated by the frequency domain resource indication information, and the resource that is allowed to overlap is not used to transmit the demodulation reference signal for the downlink data channel, determine that the first time-frequency resource belongs to the second-type time-frequency resource, where the second time-frequency resource includes a resource used to transmit the downlink data channel and the demodulation reference signal for the downlink data channel, the frequency domain resource of the second time-frequency resource is indicated by the frequency domain resource indication information in the downlink control channel, and the time domain resource of the second time-frequency resource is indicated by the time domain resource indication information in the downlink control channel.

In an embodiment, the first time-frequency resource is allowed to overlap a resource, in a second time-frequency resource, that is of a demodulation reference signal for the downlink data channel and that is indicated by frequency domain resource indication information, the resource that is allowed to overlap is not used to transmit the demodulation reference signal for the downlink data channel, a frequency domain resource of the second time-frequency resource is indicated by the frequency domain resource indication information in the downlink control channel, and a time domain resource of the second time-frequency resource is indicated by time domain resource indication information in the downlink control channel. The transceiver module is further configured to:

receive indication information from the network device, where the indication information indicates that the first time-frequency resource belongs to the first-type time-frequency resource or the second-type time-frequency resource.

In an embodiment, the first time-frequency resource belongs to resources corresponding to a group of rate matching patterns, and the resources corresponding to a group of rate matching patterns are resources, indicated by the downlink control information, that cannot be used to transmit the downlink data channel.

In an embodiment, the first time-frequency resource includes a time-frequency resource used to carry a synchronization broadcast block.

For technical effects brought by the seventh aspect or the implementations of the seventh aspect, refer to descriptions of technical effects brought by the second aspect or the implementations of the second aspect.

According to an eighth aspect, a communication apparatus is provided. The communication apparatus has a function of implementing behavior in the method embodiments in the third aspect. The function may be implemented by hardware, or may be implemented by hardware executing corresponding software. The hardware or the software includes one or more modules corresponding to the foregoing function. In an embodiment, the communication apparatus includes a processing module and a transceiver module.

The transceiver module is configured to receive configuration information from a network device, where the configuration information indicates a first time-frequency resource, and the first time-frequency resource cannot be used to transmit a downlink data channel and a demodulation reference signal for the downlink data channel.

The processing module is configured to: if indication information from the network device is received, determine to monitor at least one first downlink control channel candidate, or determine that a downlink control channel detected on at least one first downlink control channel candidate is valid, where the at least one first downlink control channel candidate overlaps the first time-frequency resource; or if indication information from the network device is not received, determine not to monitor a first downlink control channel candidate, or determine that a downlink control channel detected on a first downlink control channel candidate is invalid, where the first downlink control channel candidate overlaps the first time-frequency resource, and the indication information indicates to monitor the first downlink control channel candidate, or that the downlink control channel detected on the first downlink control channel candidate is valid.

In an embodiment, the first time-frequency resource is allowed to overlap a resource, in a second time-frequency resource, that is of the demodulation reference signal for the downlink data channel and that is indicated by frequency domain resource indication information, and the resource that is allowed to overlap is not used to transmit the downlink data channel and the demodulation reference signal for the downlink data channel. The second time-frequency resource includes a resource used to transmit the downlink data channel and the demodulation reference signal for the downlink data channel, a frequency domain resource of the second time-frequency resource is indicated by the frequency domain resource indication information in the downlink control channel, and a time domain resource of the second time-frequency resource is indicated by time domain resource indication information in the downlink control channel.

For technical effects brought by the eighth aspect or the implementations of the eighth aspect, refer to descriptions of technical effects brought by the third aspect or the implementations of the third aspect.

According to a ninth aspect, a communication apparatus is provided. The communication apparatus has a function of implementing behavior in the method embodiments in the fourth aspect. The function may be implemented by hardware, or may be implemented by hardware executing corresponding software. The hardware or the software includes one or more modules corresponding to the foregoing function. In an embodiment, the communication apparatus includes a processing module and a transceiver module.

The transceiver module is configured to receive configuration information from a network device, where the configuration information indicates a first time-frequency resource, and the first time-frequency resource cannot be used to transmit a downlink data channel and a demodulation reference signal for the downlink data channel.

The transceiver module is further configured to receive indication information from the network device, where the indication information indicates whether at least one first downlink control channel candidate associated with a first control channel resource set or in a first search space set is monitored. The processing module is configured to determine, based on the indication information, whether to monitor the at least one first downlink control channel candidate, where the first downlink control channel candidate overlaps the first time-frequency resource.

Alternatively, the transceiver module is further configured to receive indication information from the network device, where the indication information indicates whether a downlink control channel detected on at least one first downlink control channel candidate associated with a first control channel resource set or in a first search space set is valid. The processing module is configured to determine, based on the indication information, whether a first downlink control channel detected on at least one first downlink control channel candidate is valid, where the at least one first downlink control channel candidate overlaps the first time-frequency resource.

The at least one first downlink control channel candidate overlaps the first time-frequency resource.

In an embodiment, the first time-frequency resource overlaps a resource, in a second time-frequency resource, that is of the demodulation reference signal for the downlink data channel and that is indicated by frequency domain resource indication information, and the overlapped resource is not used to transmit the downlink data channel and the demodulation reference signal for the downlink data channel. The second time-frequency resource includes a resource used to transmit the downlink data channel and the demodulation reference signal for the downlink data channel, a frequency domain resource of the second time-frequency resource is indicated by the frequency domain resource indication information in the downlink control channel, and a time domain resource of the second time-frequency resource is indicated by time domain resource indication information in the downlink control channel.

For technical effects brought by the ninth aspect or the implementations of the ninth aspect, refer to descriptions of technical effects brought by the fourth aspect or the implementations of the fourth aspect.

According to a tenth aspect, a communication apparatus is provided. The communication apparatus has a function of implementing behavior in the method embodiments in the fifth aspect. The function may be implemented by hardware, or may be implemented by hardware executing corresponding software. The hardware or the software includes one or more modules corresponding to the foregoing function. In an embodiment, the communication apparatus includes a processing module and a transceiver module.

The transceiver module is configured to send configuration information to a terminal, where the configuration information indicates a first time-frequency resource, and the first time-frequency resource cannot be used to transmit a downlink data channel.

The processing module is configured to determine that the first time-frequency resource belongs to a first-type time-frequency resource or a second-type time-frequency resource, where the first time-frequency resource is allowed to overlap a resource, in a second time-frequency resource, that is of a demodulation reference signal for the downlink data channel and that is indicated by frequency domain resource indication information, the resource that is allowed to overlap is not used to transmit the demodulation reference signal for the downlink data channel, the second time-frequency resource includes a resource used to transmit the downlink data channel and the demodulation reference signal for the downlink data channel, a frequency domain resource of the second time-frequency resource is indicated by the frequency domain resource indication information in a downlink control channel, and a time domain resource of the second time-frequency resource is indicated by time domain resource indication information in the downlink control channel.

The transceiver module is further configured to send indication information to the terminal, where the indication information indicates that the first time-frequency resource belongs to the first-type time-frequency resource or the second-type time-frequency resource.

It should be understood that the transceiver module is further configured not to: if the first time-frequency resource belongs to the first-type time-frequency resource, send the downlink control channel on a downlink control channel candidate; or configured to: if the first time-frequency resource belongs to the second-type time-frequency resource, send the downlink control channel on a downlink control channel candidate, where the downlink control channel candidate overlaps the first time-frequency resource.

In an embodiment, the first time-frequency resource does not overlap the resource, in the second time-frequency resource, that is used to transmit the demodulation reference signal for the downlink data channel, and the first time-frequency resource belongs to the first-type time-frequency resource.

The first time-frequency resource overlaps the resource, in the second time-frequency resource, that is used to transmit the demodulation reference signal for the downlink data channel, the overlapped resource is not used to transmit the demodulation reference signal for the downlink data channel, and the first time-frequency resource belongs to the second-type time-frequency resource.

For technical effects brought by the tenth aspect or the implementations of the tenth aspect, refer to descriptions of technical effects brought by the fifth aspect or the implementations of the fifth aspect.

According to an eleventh aspect, an embodiment of this application provides a communication apparatus. The communication apparatus may be the communication apparatus in any one of the sixth aspect to the tenth aspect, or a chip disposed in the communication apparatus in any one of the sixth aspect to the tenth aspect. The communication apparatus includes a communication interface and a processor; and optionally, further includes a memory. The memory is configured to store a computer program, instructions, or data. The processor is coupled to the memory and the communication interface. When a processing circuit reads the computer program, the instructions, or the data, the communication apparatus is enabled to perform the method performed by the terminal or the network device in the foregoing method embodiments.

It should be understood that the communication interface may be a transceiver in the communication apparatus, for example, implemented by using a logic circuit, a transmit circuit, or a receive circuit in the communication apparatus. Alternatively, if the communication apparatus is a chip disposed in a device, the communication interface may be an input/output interface of the chip, for example, an input/output pin. The transceiver is used by the communication apparatus to communicate with another device. For example, when the communication apparatus is a terminal, the another device is a network device. Alternatively, when the communication apparatus is a network device, the another device is a terminal.

According to a twelfth aspect, a communication apparatus is provided. The communication apparatus includes a processor and a transceiver. Optionally, the communication apparatus further includes a memory. The memory is configured to store a computer program or instructions. The processor is configured to invoke the computer program or the instructions from the memory and run the computer program or the instructions. When the processor executes the computer program or the instructions in the memory, the communication apparatus is enabled to perform any implementation of the communication method in any one of the first aspect to the fifth aspect.

In an embodiment, there are one or more processors, and there are one or more memories. The memory may be integrated with the processor, or may be disposed independently of the processor. The transceiver may include a transmitter and a receiver that are coupled to each other.

According to a thirteenth aspect, a communication apparatus is provided. The communication apparatus includes an input circuit, an output circuit, and a processing circuit. The processing circuit is configured to receive a signal by using the input circuit, and transmit a signal by using the output circuit, so that the method in any one of the first aspect to the fifth aspect and any one of the implementations of the first aspect to the fifth aspect is implemented.

During implementation, the communication apparatus may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, and a signal output by the output circuit may be, for example, but not limited to, output to a transmitter and sent by the transmitter. The input circuit and the output circuit may be a same circuit, and the circuit is used as an input circuit and an output circuit at different moments. Implementations of the processor and the various circuits are not limited in this embodiment of this application.

According to a fourteenth aspect, an embodiment of this application provides a chip system. The chip system includes a processor and may further include a memory, and is configured to implement the method performed by the communication apparatus in the first aspect to the fifth aspect. In an embodiment, the chip system further includes the memory, configured to store program instructions and/or data. The chip system may include a chip, or may include a chip and another discrete component.

According to a fifteenth aspect, an embodiment of this application provides a communication system. The communication system includes one or more communication apparatuses and the network device performed the method in the first aspect to the fourth aspect. The communication system includes the one or more communication apparatuses performed the method in the first aspect to the fourth aspect, and one or more communication apparatuses performed the method in the fifth aspect.

According to a sixteenth aspect, this application provides a computer-readable storage medium. The computer-readable storage medium stores a computer program (which may also be referred to as code or instructions), and when the computer program is run, a computer is enabled to perform the method in any implementation in the first aspect to the fifth aspect.

According to a seventeenth aspect, this application provides a computer program product. The computer program product includes a computer program (which may also be referred to as code or instructions), and when the computer program is run, a computer is enabled to perform the method in any implementation in the first aspect to the fifth aspect.

For beneficial effects of the sixth aspect to the seventeenth aspect and the implementations of the sixth aspect to the seventeenth aspect, refer to descriptions of beneficial effects of the method in the first aspect to the fifth aspect and the implementations of the first aspect to the fifth aspect.

DESCRIPTION OF EMBODIMENTS

The following clearly and completely describes technical solutions in embodiments of the present application with reference to the accompanying drawings in embodiments of the present application.

The technical solutions provided in embodiments of this application may be applied to various communication systems, for example, a long term evolution (LTE) system, an LTE frequency division duplex (FDD) system, and an LTE time division duplex (TDD) system, a 5th generation (5G) system, a new radio (NR) system, a further evolved system based on LTE or NR, a future wireless communication system, another similar communication system, and the like.

Figure 1:
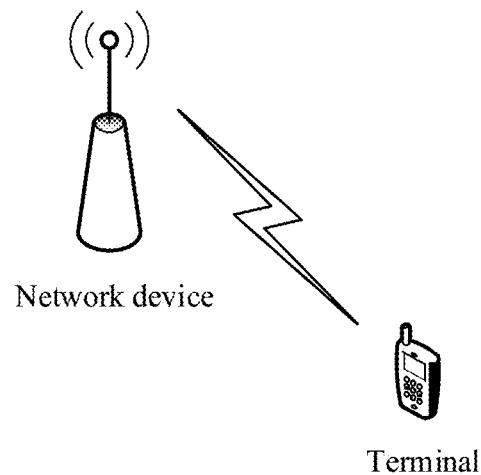
FIG. 1 is a diagram of an architecture of a communication system to which an embodiment of this application is applicable.

FIG. 1 is a diagram of a network architecture of a communication system to which an embodiment of this application is applicable. The communication system may include a network side device (which is also referred to as a network device in the following) and a terminal that communicates with the network side device. FIG. 1 is an example of the communication system. The communication system shown in FIG. 1 includes one network device and one terminal that communicates with the network device. Actually, the communication system may include a plurality of terminals. This is not limited in this embodiment of this application.

The network device may be a device that can communicate with the terminal, or may be an access network device. The access network device may also be referred to as a radio access network (RAN) device, and is a device that provides a wireless communication function for a terminal device. The access network device includes, for example, but is not limited to, a next generation NodeB (gNB), an evolved NodeB (eNB), a baseband unit (BBU), a transmission reception point (TRP), or a transmission point (TP) in 5G, a base station in a future mobile communication system, or an access point in a Wi-Fi system. Alternatively, the access network device may be a radio controller, a centralized unit (CU), and/or a distributed unit (DU) in a cloud radio access network (CRAN) scenario, or the network device may be a relay station, a vehicle-mounted device, a network device in a future evolved PLMN network, or the like.

The terminal is also referred to as user equipment, a terminal apparatus, or a terminal device, and includes a device that provides a user with voice and/or data connectivity, for example, may include a hand-held device with a wireless connection function, or a processing device connected to a wireless modem. The terminal apparatus may communicate with a core network through a radio access network (RAN), and exchange voice and/or data with the RAN. The terminal apparatus may be user equipment (UE), a wireless terminal apparatus, a mobile terminal apparatus, a device-to-device (D2D) terminal apparatus, a V2X terminal apparatus, a machine-to-machine/machine-type communication (M2M/MTC) terminal apparatus, an Internet of things (IoT) terminal apparatus, a subscriber unit, a subscriber station, a mobile station, a remote station, an access point (AP), a remote terminal, an access terminal, a user terminal, a user agent, an aircraft (such as an uncrewed aerial vehicle, a hot air balloon, or a civil aviation passenger aircraft), a user device, or the like. For example, the terminal apparatus may be a mobile phone (or referred to as a "cellular" phone), a computer with a mobile terminal apparatus, or a portable, pocket-sized, handheld, or computer built-in mobile apparatus. For example, the terminal device may include a device, for example, a personal communication service (PCS) phone, a cordless phone, a session initiation protocol (SIP) phone, a wireless local loop (WLL) station, a personal digital assistant (PDA), or the like. The terminal device may alternatively include a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

By way of example, and not limitation, in embodiments of this application, a vehicle-mounted apparatus placed or installed on a vehicle may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

In addition, embodiments of this application are also applicable to another future-oriented communication technology. Network architectures and service scenarios described in this application are intended to describe the technical solutions in this application more clearly, and do not constitute a limitation on the technical solutions provided in this application. A person of ordinary skill in the art may learn that with evolution of network architectures and emergence of new service scenarios, the technical solutions provided in this application are also applicable to similar technical problems.

In the communication system, the network device may send DCI to the terminal on a downlink control channel, for example, a PDCCH. The DCI may include information such as uplink scheduling information used to schedule the terminal to transmit data on an uplink data channel or downlink scheduling information used to schedule the terminal to receive a downlink data channel. It should be noted that the downlink control channel is used to carry downlink data information, and may be a PDSCH, an enhanced physical downlink shared channel (EPDSCH), or another downlink control channel. In this specification, an example in which the downlink data channel is a PDSCH is used.

The PDCCH is transmitted in a plurality of consecutive control channel elements (CCE). The CCE may include a plurality of resource-element groups (REG), and each REG corresponds to one resource block (RB) on one orthogonal frequency division multiplexing (OFDM) symbol. A quantity of CCEs occupied by one PDCCH may be referred to as an aggregation level (AL) of the PDCCH. For example, if the PDCCH occupies four CCEs, an aggregation level of the PDCCH is 4. In the NR system, one PDCCH may include L={1, 2, 4, 8, 16} CCEs. It should be understood that L is an aggregation level of the PDCCH.

The network device may preconfigure, for the terminal device through higher layer signaling, a PDCCH candidate corresponding to each piece of DCI, namely, a time-frequency resource location of a PDCCH at each aggregation level. In other words, a PDCCH candidate may send a PDCCH of a terminal, or may not send a PDCCH of the terminal. The network device does not notify the terminal of a PDCCH candidate or PDCCH candidates on which the network device sends DCI. To determine whether a PDCCH of the terminal exists, the terminal needs to monitor a PDCCH candidate corresponding to to-be-received DCI.

The terminal may monitor, in a search space (SS), the PDCCH candidate corresponding to the to-be-received DCI. An SS whose AL is L may be considered as a set including several PDCCH candidates with a size of L CCEs. The terminal may further monitor the SS in a search space set, and the search space set is a set of SSs including different ALs. One search space set is associated with one control resource set (CORESET), but one CORESET may be associated with a plurality of search space sets. The CORESET may be considered as a time-frequency resource set. In time domain, one CORESET includes one or more consecutive OFDM symbols. In frequency domain, one CORESET includes a group of consecutive or nonconsecutive RBs, and includes search spaces at different aggregation levels. In other words, all PDCCH candidates corresponding to one given aggregation level in one CORESET form one search space. A sum of search spaces corresponding to all aggregation levels corresponding to one piece of DCI may be referred to as a search space set. The network device configures a time domain parameter such as a period or an offset for the search space set. The terminal may determine, based on the time domain parameter of the search space set and a time-frequency resource parameter of the CORESET associated with the search space set, a size and a location of a group of time-frequency resources corresponding to the search space set.

Figure 2:
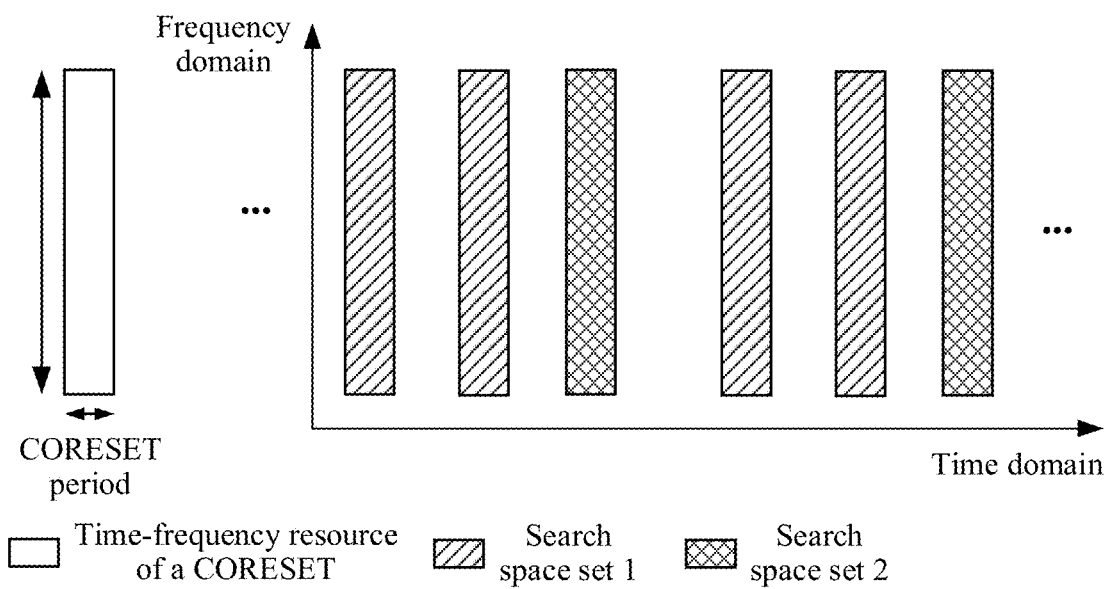
FIG. 2 is a diagram of association between a control resource set and a search space set according to an embodiment of this application.

FIG. 2 is a diagram of association between a CORESET and a search space set. FIG. 2 is described by using an example in which a CORESET is associated with two search space sets, and the two search space sets are a search space set 1 and a search space set 2. A size and a location of a time-frequency resource of the CORESET may be determined based on a time-frequency resource parameter of the CORESET. A size and a location of a time-frequency resource corresponding to the search space set may be determined based on a time domain parameter such as a period or an offset configured by the network device for the search space set. It should be understood that an AL and a quantity of PDCCH candidates corresponding to each AL are configured for a search space set. A time-frequency resource location of a PDCCH candidate corresponding to the search space set may be determined based on a size and a location of a time-frequency resource corresponding to the search space set determined in FIG. 2.

The foregoing describes some concepts in embodiments of this application. The following describes technical features in embodiments of this application.

DCI carried on a PDCCH for scheduling a PDSCH includes two indication fields: frequency domain resource assignment and time domain resource assignment. The terminal determines a time-frequency resource block based on an indication of the two indication fields. The time-frequency resource block may be used to transmit the PDSCH and a DM-RS of the PDSCH.

In the NR system, some resources that cannot be used to transmit the PDSCH are defined. If the resources overlap (which may also be considered that there is an intersection) the time-frequency resource that is used to transmit the PDSCH and that is determined by using the indication of the DCI, the overlapped time-frequency resources cannot be used to transmit the PDSCH. A time-frequency resource that cannot be used to transmit the PDSCH may be, for example, an RB symbol-level resource, an RE-level resource, or a synchronization signal/physical broadcast channel block (SSB) (which is referred to as a synchronization broadcast block in this specification) resource. The following is described by using an example in which a time-frequency resource that cannot be used to transmit a PDSCH is an RB symbol-level resource.

If the overlapped time-frequency resource cannot be used to transmit the PDSCH, it may also be considered that the PDSCH is not mapped (which may also be referred to as "occupied" or "used") to the overlapped time-frequency resource. The overlapped time-frequency resource may be referred to as a rate matching resource. In other words, rate matching means that a transmitter performs channel encoding on to-be-sent data based on an actually provided available resource, and then sends encoded data on the available resource. If a total resource is S1 and an unavailable resource is S2, an available resource is (S1−S2), namely, the rate matching resource. Rate matching means that channel encoding is directly performed on to-be-transmitted data based on the resource of (S1−S2), and data is mapped and sent to the resource of (S1−S2). For example, the network device does not send the PDSCH on the resource occupied by the SSB, and the terminal does not receive the PDSCH on the resource occupied by the SSB.

An RB symbol-level rate matching resource may be indicated by using a rate matching pattern. A maximum of four BWP-level rate matching patterns may be configured for each bandwidth part (BWP) of the terminal, and a maximum of four cell-level rate matching patterns may be configured for each serving cell. In other words, when the terminal works in one active BWP, there are a maximum of four BWP-level rate matching patterns and four cell-level rate matching patterns. One rate matching pattern may include one reserved resource pair, and the network device may configure a parameter indicating the reserved resource pair. For example, the network device may configure two parameters. The two parameters are a parameter indicating a resource block and a parameter indicating a symbol in a resource block.

Figure 3:
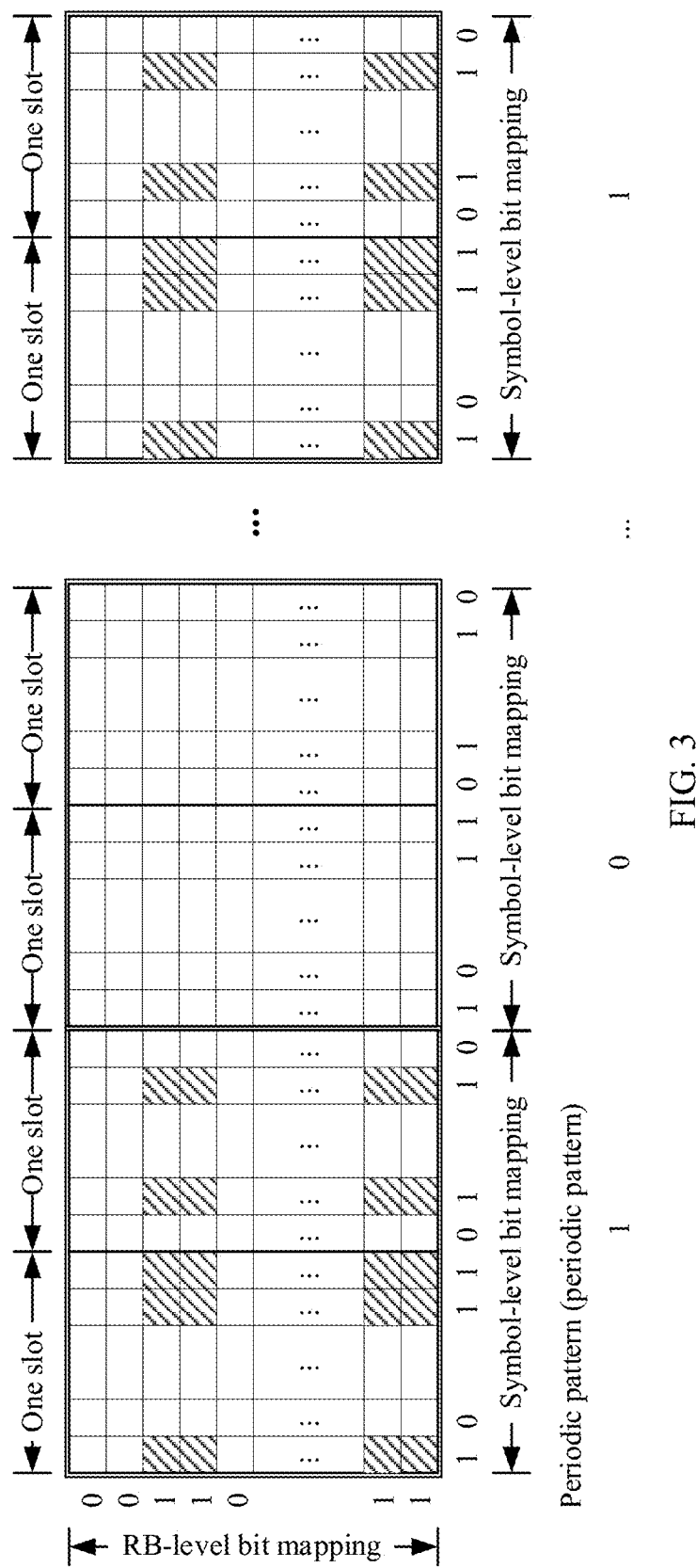
FIG. 3 is a diagram of determining a resource based on a rate matching pattern according to an embodiment of this application.

As shown in FIG. 3, the parameter indicating a resource block may be an RB-level bitmap (namely, an RB-level bitmap in FIG. 3) at a granularity of 1 RB, and the parameter indicating a symbol in a resource block is a symbol-level bitmap (namely, a symbol-level bitmap in FIG. 3) in one slot or two slots. FIG. 3 is described by using an example in which the parameter indicating a symbol in a resource block is a symbol-level bitmap in two slots. If a bit value of the RB-level bitmap and a bit value of the symbol-level bitmap are 1, it indicates that a corresponding resource cannot be used to send the PDSCH. For each pair of an RB-level bitmap and a symbol-level bitmap, a periodic pattern may be used to configure a time domain pattern. Each bit in the periodic pattern corresponds to an interval corresponding to one symbol-level bitmap. If the bit is equal to 1, it indicates that the unit has a reserved resource pair. As shown in FIG. 3, resources represented by shadow parts cannot be used to send the PDSCH. The periodic pattern may correspond to intervals corresponding to {1, 2, 4, 5, 8, 10, 20, or 40} symbol-level bitmaps, and a maximum interval is 40 ms. It is assumed that an interval corresponding to a periodic pattern is P ms, and a first symbol in every 40/P periods corresponds to a first symbol in an $n_f^{th}$ frame, where $n_f$ mod 4=0. If a corresponding periodic pattern is not configured for a bitmap pair, for the symbol-level bitmap in two slots, a first slot and a second slot respectively correspond to an even slot and an odd slot in a frame, and for the symbol-level bitmap in one slot, the slot corresponds to each slot in a frame. One bitmap pair may be included in one or two resource groups.

The resource group includes a resource set corresponding to a group of rate matching patterns. The network device may configure a resource group, for example, a rate matching pattern group 1 or a rate matching pattern group 2. The network device may indicate whether a resource in the resource group can be used to transmit the PDSCH. For example, for a PDSCH scheduled by using DCI format 1_1, DCI includes a rate matching indicator field, and each bit of the rate matching indicator field corresponds to one rate matching pattern group. If a bit corresponding to a rate matching pattern group is 1, a resource in the rate matching pattern group cannot be used to transmit the PDSCH. In addition, for the PDSCH scheduled by using DCI format 1_1, a resource corresponding to a rate matching pattern that is not included in any rate matching pattern group cannot be used to transmit the PDSCH. For a PDSCH scheduled by using DCI format 1_0 or a semi-persistent scheduling (SPS) PDSCH activated by using DCI format 1_0, a resource in the rate matching pattern group 1 or the rate matching pattern group 2 cannot be used to transmit the PDSCH.

In some embodiments, to reduce complexity of channel estimation of the terminal, it is stipulated that a DM-RS resource, indicated by DCI, of a PDSCH cannot overlap a resource (for example, a resource used to carry an SSB) that cannot be used to transmit the PDSCH. However, in some other embodiments, an RB symbol-level rate matching (RM) resource (which is referred to as an RM resource for ease of description) may overlap a DM-RS resource, indicated by DCI, of a PDSCH. The terminal may consider that the resource overlapping the RB symbol-level RM resource does not receive a DM-RS of the PDSCH. To reduce complexity of channel estimation of the terminal, the RM resource overlapping the DM-RS resource that can transmit the PDSCH needs to ensure that the PDSCH cannot be sent in time domain of any overlapped RB. In this case, the RM resource may be configured as a full time domain resource, that is, a time domain resource of the RM resource is all of a time domain resource in a frequency domain range of the RM resource.

Figure 4:
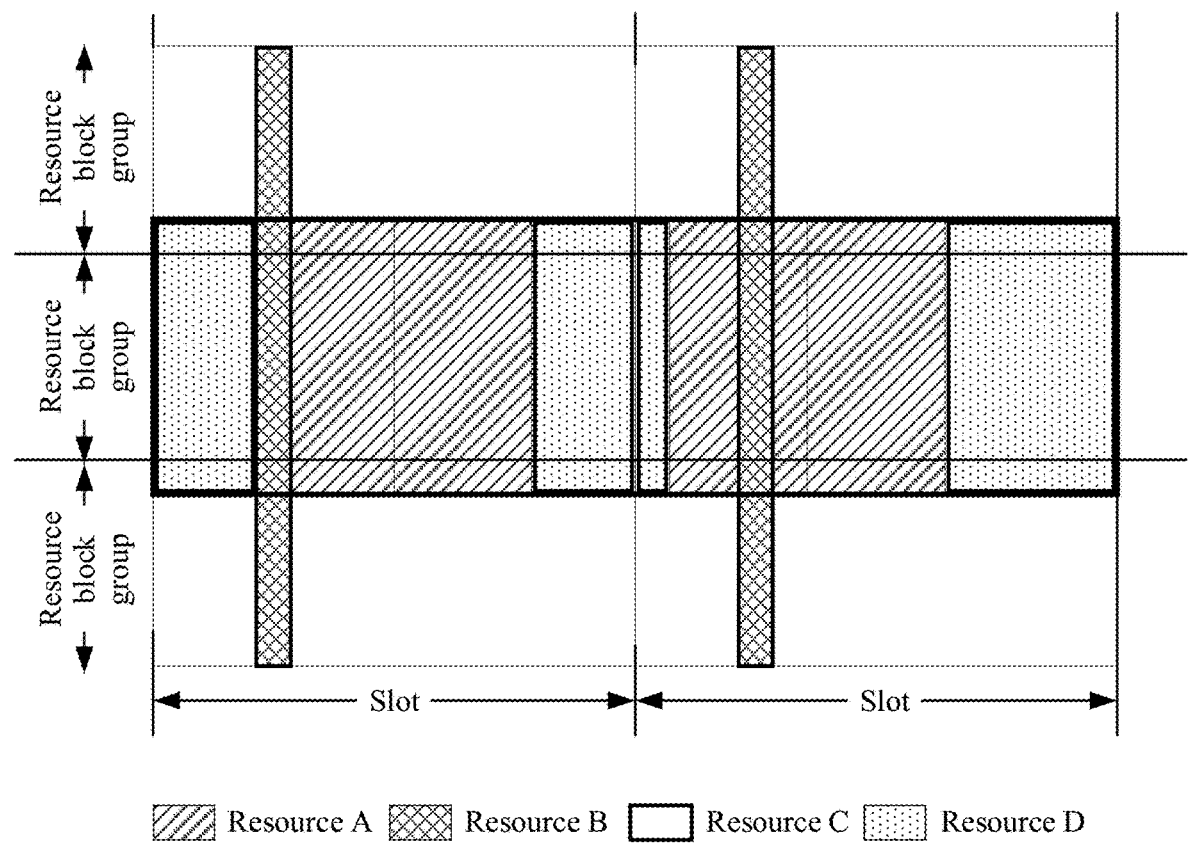
FIG. 4 is a diagram of a time-frequency resource according to an embodiment of this application.

For ease of understanding, refer to FIG. 4. FIG. 4 is a diagram of an RM resource. In FIG. 4, a resource A is used to transmit an SSB or for another purpose, and a resource B is a resource, indicated by DCI, used to transmit a DM-RS. Because the resource A overlaps the resource B, a resource C shown in FIG. 4 may be configured as an RM resource, that is, a resource (for example, a resource D in FIG. 4) that cannot be used to transmit a PDSCH is used as a portion of the RM resource, to avoid increasing complexity of channel estimation of UE. The resource C (a resource represented by a thick line) shown in FIG. 4 may be understood as a full time domain resource. It should be understood that a frequency domain resource of the resource C is the same as a frequency domain resource of the resource A, and a time domain resource, namely, a time domain resource shown in two slots in FIG. 4, of the resource C is a time domain resource that cannot be used to transmit the PDSCH. For a PDSCH scheduled at a specific time, it may also be understood that the time domain resource of the resource C includes the entire time domain resource of the PDSCH.

In some embodiments, it is stipulated that if a PDCCH candidate overlaps the RM resource, the terminal does not monitor the PDCCH candidate. Still refer to FIG. 4. If the PDCCH candidate overlaps the resource C, the terminal does not monitor the PDCCH candidate. However, although the resource D in the resource C cannot be used to transmit the PDSCH, the resource D may be used to transmit another possible signal (for example, a PDCCH). If the terminal, as it is stipulated, does not monitor the PDCCH candidate that overlaps the resource C, fewer PDCCHs are transmitted, and resource usage is low.

In view of this, an embodiment of this application provides a communication method. In the method, whether a PDCCH candidate overlapping an RM resource can send a PDCCH may be determined based on a type of the RM resource, that is, whether the PDCCH candidate overlapping the RM resource is monitored is determined. This can transmit more PDCCHs as much as possible, and improve resource usage.

The technical solutions provided in this embodiment of this application may be applied to a wireless communication system, for example, a 4.5G system or a 5G system, a further evolved system based on LTE or NR, and a future wireless communication system or another similar communication system. The following describes the technical solutions provided in this embodiment of this application with reference to the accompanying drawings.

An embodiment of this application provides a communication method. The following is described by using an example in which the method is applied to the network architecture shown in FIG. 1. In addition, the method may be performed by two communication devices, and the two communication devices are, for example, a first communication apparatus and a second communication apparatus. The first communication apparatus may be a network device or a communication apparatus (for example, a chip system) that can support a network device to implement a function required by the method, or may be a terminal or a communication apparatus (for example, a chip system) that can support a terminal to implement a function required by the method. Same as the first communication apparatus, the second communication apparatus may be a network device or a communication apparatus (for example, a chip system) that can support a network device to implement a function required by the method, or may be a terminal or a communication apparatus (for example, a chip system) that can support a terminal to implement a function required by the method. Implementations of the first communication apparatus and the second communication apparatus are not limited. For example, both the first communication apparatus and the second communication apparatus are terminals, or the first communication apparatus is a terminal, and the second communication apparatus is a communication apparatus that can support the terminal to implement a function required by the method. The network device is, for example, a base station.

Figure 5:
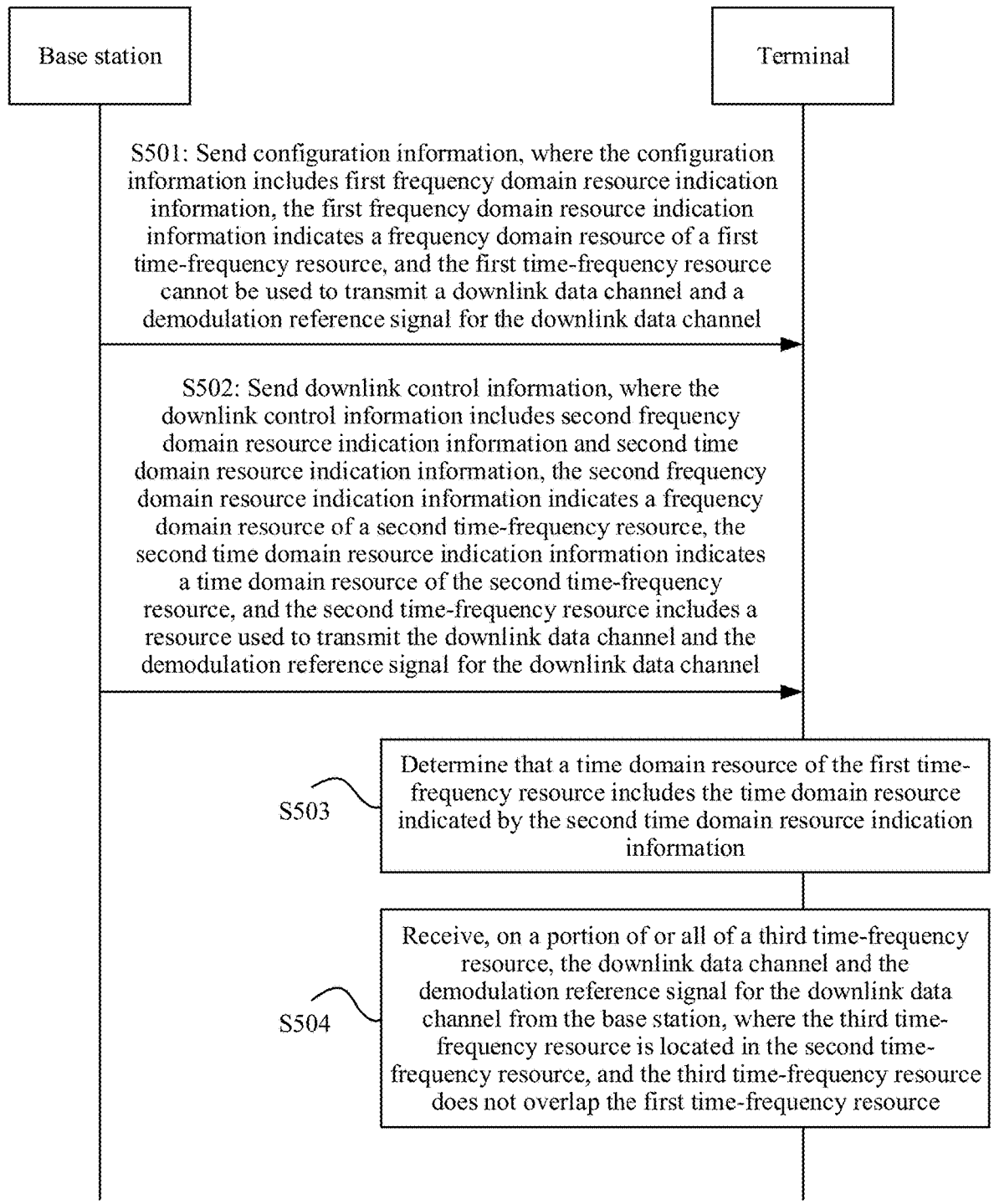
FIG. 5 is a flowchart of an example of a communication method according to an embodiment of this application.

FIG. 5 is a flowchart of an example of a communication method according to an embodiment of this application. The following is described by using an example in which the method is performed by a network device and a terminal, that is, the first communication apparatus is a terminal, the second communication apparatus is a network device, and the network device is a base station. It should be noted that this embodiment of this application is merely described by using a network device and a terminal as an example, and is not limited to the two communication apparatuses.

S501: A base station sends configuration information to a terminal, and the terminal receives the configuration information, where the configuration information includes first frequency domain resource indication information, the first frequency domain resource indication information indicates a frequency domain resource of a first time-frequency resource, and the first time-frequency resource cannot be used to transmit a downlink data channel and a demodulation reference signal for the downlink data channel.

In this embodiment of this application, a time-frequency resource that cannot be used to transmit the downlink data channel and the demodulation reference signal for the downlink data channel is referred to as the first time-frequency resource. For example, the first time-frequency resource is a time-frequency resource that cannot be used to transmit a PDSCH and a DM-RS for the PDSCH. For example, the first time-frequency resource may be a time-frequency resource that is not used to carry an SSB, or a resource that is not be used to carry downlink data. The following is described by using an example in which the first time-frequency resource is a time-frequency resource that is not used to carry an SSB. Still refer to the example in FIG. 4. The first time-frequency resource may be the resource C shown in FIG. 4. It should be noted that that the first time-frequency resource cannot be used to transmit the downlink data channel and the demodulation reference signal for the downlink data channel means that the downlink data channel and the demodulation reference signal for the downlink data channel cannot be sent on the first time-frequency resource for a transmitter; and means that the downlink data channel and the demodulation reference signal for the downlink data channel are not received on the first time-frequency resource for a receiver.

In this embodiment of this application, the first time-frequency resource is allowed to overlap a DM-RS resource, indicated by downlink control information, of the PDSCH. It may also be considered that the first time-frequency resource has a capability to overlap the DM-RS resource, indicated by the downlink control information, of the PDSCH, or the first time-frequency resource can overlap the DM-RS resource, indicated by the downlink control information, of the PDSCH. The first time-frequency resource is allowed to overlap the DM-RS resource, indicated by the downlink control information, of the PDSCH, provided that the resource that is allowed to overlap is not used to transmit the PDSCH and a DM-RS for the PDSCH. To avoid affecting sending of the DM-RS for the PDSCH, it needs to be ensured that any RB on the first time-frequency resource that overlaps the resource, indicated by the downlink control information, of the PDSCH cannot be used to transmit the PDSCH and the DM-RS for the PDSCH. Therefore, a time domain resource of the first time-frequency resource at least includes a time domain resource used to transmit the PDSCH and the DM-RS for the PDSCH. A time domain resource for which the first time-frequency resource may be configured is all of a time domain resource in the frequency domain resource, namely, a full time domain resource. For example, when configuring the first time-frequency resource for the terminal, the base station may configure the frequency domain resource of the first time-frequency resource. For the terminal, it may be considered that the time domain resource of the first time-frequency resource is a full time domain resource, all of a time domain resource in a slot in which the time domain resource indicated by the downlink control information is located, or a time domain resource indicated by the downlink control information.

In some embodiments, when configuring the first time-frequency resource for the terminal, the base station may send the configuration information to the terminal. The configuration information may include the first frequency domain resource indication information, and the first frequency domain resource indication information may indicate the frequency domain resource of the first time-frequency resource. In this case, the terminal receives the configuration information, and may determine a first frequency domain resource based on the first frequency domain resource indication information. The time domain resource configured by the base station for the terminal is a full time domain resource by default, so that the terminal can determine the first time-frequency resource.

In some other embodiments, the base station may configure the first time-frequency resource for the terminal by using a rate matching pattern. It should be understood that each rate matching pattern corresponds to one reserved resource pair, and the base station may configure a parameter indicating the reserved resource pair, for example, including the foregoing parameter indicating a resource block, a parameter indicating a symbol in a resource block, or a parameter indicating a periodic pattern. For ease of description, in the following, "the parameter indicating a resource block" is referred to as a first parameter, "the parameter indicating a symbol in a resource block" is referred to as a second parameter, and "the parameter indicating a periodic pattern" is referred to as a third parameter. It should be understood that the first parameter may be the RB-level bitmap shown in FIG. 3, the second parameter may be the symbol-level bitmap shown in FIG. 3, and the third parameter may be the periodic pattern shown in FIG. 3. It should be understood that the first frequency domain resource indication information may be the first parameter.

The base station configures the first time-frequency resource for the terminal by using the rate matching pattern. In other words, the base station configures a resource indicated by a rate matching pattern for the terminal. For example, there are a plurality of rate matching pattern groups (for example, a rate matching pattern group 1 and a rate matching pattern group 2), and the base station may configure that the rate matching pattern belongs to a rate matching pattern group. Further, the base station indicates, by using the DCI, whether a resource in the rate matching pattern group can be used to transmit the PDSCH. For example, the DCI may include a rate matching indicator field, and the rate matching indicator field may indicate whether a resource in a rate matching pattern group can be used to transmit the PDSCH. For example, each bit of the rate matching indicator field corresponds to one rate matching pattern group. If a bit corresponding to a rate matching pattern group is 1, a resource in the rate matching pattern group cannot be used to transmit the PDSCH. Alternatively, the base station may schedule the PDSCH by using a DCI format. For a PDSCH scheduled by using DCI format 1_1, a resource corresponding to a rate matching pattern that is not included in any rate matching pattern group cannot be used to transmit the PDSCH. For a PDSCH scheduled by using DCI format 1_0 or an SPS PDSCH activated by using DCI format 1_0, a resource in the rate matching pattern group 1 or the rate matching pattern group 2 cannot be used to transmit the PDSCH.

It should be understood that when configuring the first time-frequency resource for the terminal, the base station needs to configure the frequency domain resource of the first time-frequency resource. Therefore, if the base station configures the first time-frequency resource for the terminal by using the rate matching pattern, the base station configures, for the terminal by using the rate matching indicator field in the DCI, the resource in the rate matching pattern group indicated by the rate matching indicator field, and further needs to send the first parameter to the terminal, to indicate the frequency domain resource of the first time-frequency resource. It may be understood that the first frequency domain resource indication information is the first parameter. The terminal may determine, based on the rate matching indicator field in the DCI, that the first time-frequency resource is a resource belonging to a rate matching pattern group, and then determine a frequency domain resource based on the first parameter, to further determine the first time-frequency resource.

S502: The base station sends the DCI to the terminal, and the terminal receives the DCI, where the DCI includes second frequency domain resource indication information and second time domain resource indication information, the second frequency domain resource indication information indicates a frequency domain resource of a second time-frequency resource, the second time domain resource indication information indicates a time domain resource of the second time-frequency resource, and the second time-frequency resource includes a resource used to transmit the PDSCH and the DM-RS for the PDSCH.

The second time-frequency resource may include the resource used to transmit the PDSCH and the DM-RS for the PDSCH. Still refer to the example in FIG. 4. The second time-frequency resource may be the resource shown in FIG. 4. The base station may configure the second time-frequency resource for the terminal by using the DCI. For example, the base station sends the DCI to the terminal, where the DCI may indicate the second time-frequency resource. The DCI includes the second time domain resource indication information, and indicates the time domain resource of the second time-frequency resource. The DCI further includes the second frequency domain resource indication information, and indicates the frequency domain resource of the second time-frequency resource. It should be understood that the second frequency domain resource indication information and the second time domain resource indication information respectively correspond to frequency domain resource assignment and time domain resource assignment in the DCI. The terminal receives the DCI, and may determine the second time-frequency resource based on the second frequency domain resource indication information and the second time domain resource indication information.

S503: The terminal determines that the time domain resource of the first time-frequency resource includes the time domain resource indicated by the second time domain resource indication information.

In this embodiment of this application, the first time-frequency resource cannot be used to transmit the PDSCH and the DM-RS for the PDSCH, and the second time-frequency resource includes a resource used to transmit the PDSCH and the DM-RS for the PDSCH. Because the first time-frequency resource is allowed to overlap a resource, in the second time-frequency resource, that is of the DM-RS for the PDSCH and that is indicated by the second frequency domain resource indication information, where the resource is the DM-RS resource on the resource B. To avoid affecting channel estimation, the DM-RS for the PDSCH is not transmitted on the first time-frequency resource and a resource overlapping the resource, in the second time-frequency resource, that is of the DM-RS for the PDSCH and that is indicated by the second frequency domain resource indication information. In other words, the PDSCH and the DM-RS for the PDSCH are not transmitted on a portion of the second time-frequency resource. Therefore, when determining that the time domain resource of the first time-frequency resource includes the time domain resource indicated by the second time domain resource indication information, that is, determining that the time domain resource of the first time-frequency resource includes the time domain resource of the second time-frequency resource, the terminal may receive the PDSCH and the DM-RS for the PDSCH on a portion of the second time-frequency resource.

It should be noted that the resource that is of the DM-RS for the PDSCH and that is indicated by the second frequency domain resource indication information is a resource, in all frequency domain ranges, that is of the DM-RS for the PDSCH and that is indicated by the second frequency domain resource indication information, instead of a resource actually used to transmit the DM-RS for the PDSCH. The second time-frequency resource is indicated by the base station by using the DCI. Therefore, in this specification, the resource that is of the DM-RS for the PDSCH and that is indicated by the second frequency domain resource indication information may also be considered as the resource that is of the DM-RS for the PDSCH and that is indicated by the downlink control information. The resource is a resource that is of the DM-RS for the PDSCH and that corresponds to the frequency domain resource indication information in the downlink control channel.

In some embodiments, that the terminal determines that the time domain resource of the first time-frequency resource includes the time domain resource indicated by the second time domain resource indication information may be that the terminal determines that the time domain resource of the first time-frequency resource is all of the time domain resource, all of a time domain resource of a slot in which the time domain resource indicated by the second time domain resource indication information is located, or the time domain resource indicated by the second time domain resource indication information. The time domain resource of the first time-frequency resource includes the time domain resource indicated by the second time domain resource indication information.

S504: The terminal receives, on a portion of or all of a third time-frequency resource, the downlink data channel and the demodulation reference signal for the downlink data channel from the base station, where the third time-frequency resource is located in the second time-frequency resource, and the third time-frequency resource does not overlap the first time-frequency resource.

When the terminal determines that the time domain resource of the first time-frequency resource includes the time domain resource of the second time-frequency resource, that is, determines that the resource that cannot be used to transmit the PDSCH and the DM-RS for the PDSCH overlaps the resource that is of the DM-RS for the PDSCH and that is indicated by the second frequency domain resource indication information, the terminal may receive the PDSCH and the DM-RS for the PDSCH on a portion of the second time-frequency resource. For ease of description, a portion of the second time-frequency resource is referred to as the third time-frequency resource in the following. It should be understood that the third time-frequency resource does not overlap the first time-frequency resource. In other words, the third time-frequency resource is a second time-frequency resource, in the second time-frequency resource, that does not overlap the first time-frequency resource. However, a portion of the first time-frequency resource may be used to transmit the PDCCH, and the terminal may receive the PDCCH on another portion of the time-frequency resource, to transmit more PDCCHs, and improve resource usage.

For example, when the time domain resource of the first time-frequency resource is the same as the time domain resource of the second time-frequency resource, the third time-frequency resource is a resource, in a range of the first frequency domain resource, that does not include the time domain resource of the second time-frequency resource. In other words, all time domain resources in the range of the first frequency domain resource are RM resources. For another example, when the time domain resource of the first time-frequency resource is greater than the time domain resource of the second time-frequency resource, the time domain resource of the second time-frequency resource in the range of the first frequency domain resource is an RM resource. It may also be understood that the base station does not send the PDSCH on the time domain resource of the second time-frequency resource in the range of the first frequency domain resource.

It should be understood that when there is no other rate matching resource, the terminal may receive the PDSCH and the DM-RS for the PDSCH on all of the third time-frequency resource. When there is another rate matching resource, the terminal may also receive the PDSCH and the DM-RS for the PDSCH on a portion of the third time-frequency resource.

In some embodiments, the configuration information sent by the base station to the terminal may further include a parameter indicating a time domain resource, for example, the second parameter or the third parameter. Alternatively, the configuration information may include the second parameter and the third parameter. It is equivalent to that the frequency domain resource of the first time-frequency resource configured by the base station for the terminal is the frequency domain resource indicated by the first frequency domain resource indication information, and the time domain resource configured by the base station for the terminal is the time domain resource indicated by the second parameter and/or the third parameter. To distinguish the time-frequency resource configured by the base station for the terminal through configuring the frequency domain resource from the time-frequency resource configured by the base station for the terminal through configuring the frequency domain resource and time domain resource, when the configuration information includes the second parameter and/or the third parameter, a time-frequency resource that is configured by the base station for the terminal and that is determined based on the frequency domain resource of the first time-frequency resource and the second parameter and/or the third parameter is referred to as a fourth time-frequency resource in the following.

It should be understood that a frequency domain resource of the fourth time-frequency resource is the frequency domain resource of the first time-frequency resource, and a time domain resource of the fourth time-frequency resource is a portion of or all of the time domain resource of the first time-frequency resource. Therefore, the fourth time-frequency resource cannot be used to transmit the PDSCH and the DM-RS for the PDSCH. In this case, the terminal may determine, based on a case in which a downlink control channel candidate overlaps the fourth time-frequency resource, whether to monitor the downlink control channel candidate.

In some embodiments, if the downlink control channel candidate overlaps the fourth time-frequency resource, the terminal may not monitor the downlink control channel candidate, to reduce complexity of channel estimation of the terminal as much as possible.

In an alternative implementation, if the downlink control channel candidate overlaps the fourth time-frequency resource, the terminal may monitor the downlink control channel candidate, and determines that a downlink control channel detected on the downlink control channel candidate is invalid. This can avoid interference between the control channel and another signal. It should be noted that the terminal may monitor at least one downlink control channel candidate that overlaps the fourth time-frequency resource, but does not monitor all downlink control channel candidates that overlap the fourth time-frequency resource.

In this embodiment of this application, the resource that cannot be used to transmit the PDSCH and the DM-RS for the PDSCH may overlap the resource used to transmit the DM-RS for the PDSCH. Therefore, when the first time-frequency resource that cannot be used to transmit the PDSCH and the DM-RS for the PDSCH overlaps the second time-frequency resource including the resource used to transmit the PDSCH and the DM-RS for the PDSCH, the terminal may receive the PDSCH and the DM-RS for the PDSCH on the third time-frequency resource in the second time-frequency resource, and receive, for example, a PDCCH on a portion of the first time-frequency resource. This can transmit more PDCCHs and improve resource usage.

Figure 6:
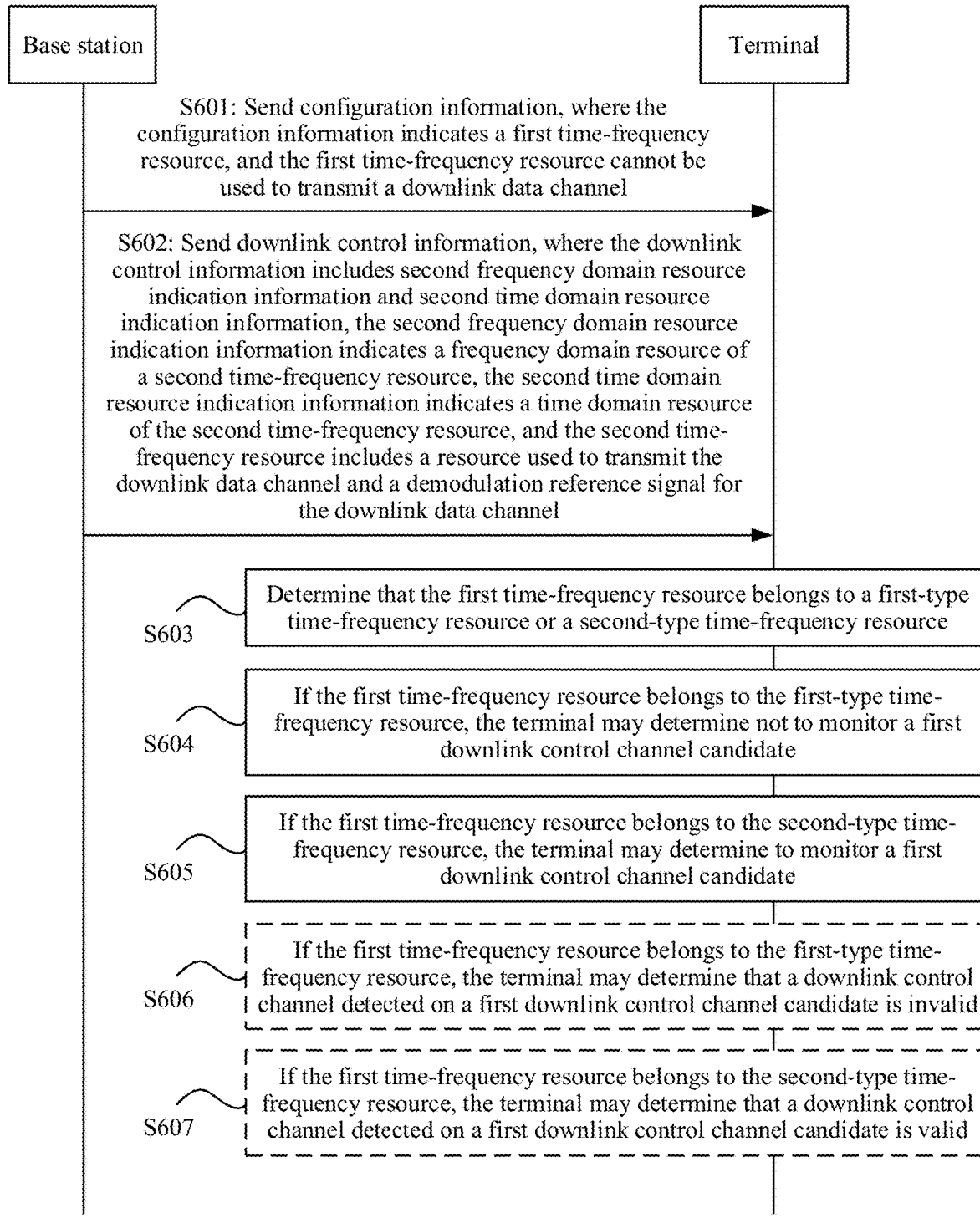
FIG. 6 is a flowchart of an example of a communication method according to an embodiment of this application.

FIG. 6 is a flowchart of an example of a communication method according to an embodiment of this application. The following is described by using an example in which the method is performed by a network device and a terminal, and the network device is a base station. It should be noted that this embodiment of this application is merely described by using a network device and a terminal as an example, and is not limited to the two communication apparatuses.

S601: A base station sends configuration information to a terminal, and the terminal receives the configuration information, where the configuration information indicates a first time-frequency resource, and the first time-frequency resource cannot be used to transmit a downlink data channel.

In this embodiment of this application, the first time-frequency resource is a resource that cannot be used to transmit the downlink data channel. For example, the first time-frequency resource is a time-frequency resource that is not used to transmit a PDSCH. For example, the first time-frequency resource is a time-frequency resource used to carry an SSB. For example, the first time-frequency resource is the resource C shown in FIG. 4.

When configuring the first time-frequency resource for the terminal, the base station may send the configuration information to the terminal. The configuration information may include first time domain resource indication information and first frequency domain resource indication information. The first time domain resource indication information may indicate a time domain resource of the first time-frequency resource, and the first frequency domain resource indication information may indicate a frequency domain resource of the first time-frequency resource. The terminal receives the configuration information, and may determine the first time-frequency resource based on the first time domain resource indication information and the first frequency domain resource indication information.

It is clear that S601 is similar to S501. The base station may alternatively place the first time-frequency resource in a rate matching pattern group, and indicate, by using DCI, whether a resource in the rate matching pattern group is used to transmit the PDSCH. For details, refer to descriptions of the embodiment related to S501. Details are not described herein again. Further, the base station may send at least one of the first parameter, the second parameter, and the third parameter to the terminal, to indicate a specific time domain resource and/or a specific frequency domain resource. The terminal may determine the first time-frequency resource based on the received parameter.

S602: The base station sends DCI to the terminal, and the terminal receives the DCI, where the DCI includes second frequency domain resource indication information and second time domain resource indication information, the second frequency domain resource indication information indicates a frequency domain resource of a second time-frequency resource, the second time domain resource indication information indicates a time domain resource of the second time-frequency resource, and the second time-frequency resource includes a resource used to transmit the PDSCH and a DM-RS for the PDSCH.

For details, refer to descriptions in S502. Details are not described herein again.

S603: The terminal determines that the first time-frequency resource belongs to a first-type time-frequency resource or a second-type time-frequency resource.

In some embodiments, a time-frequency resource (namely, the first time-frequency resource) that cannot be used to transmit the PDSCH is not allowed to overlap the resource used to transmit the DM-RS for the PDSCH. It may also be considered that the first time-frequency resource does not have a capability to overlap the resource used to transmit the DM-RS for the PDSCH. In this specification, the first time-frequency resource cannot overlap the resource used to transmit the DM-RS for the PDSCH. In this case, to reduce complexity of channel estimation of the terminal, the terminal may not monitor a downlink control channel candidate overlapping the first time-frequency resource.

In some other embodiments, a time-frequency resource (namely, the first time-frequency resource) that cannot be used to transmit the PDSCH can overlap the resource that is of the DM-RS for the PDSCH and that is indicated by the second frequency domain resource indication information. The overlapped resource is not used to transmit the PDSCH and the DM-RS for the PDSCH. Although the first time-frequency resource and a resource overlapping the resource that is of the DM-RS for the PDSCH and that is indicated by the second frequency domain resource indication information are not used to send the DM-RS for the PDSCH, a portion of the first time-frequency resource may be used to send another possible signal, for example, a PDCCH. The terminal may monitor a downlink control channel candidate overlapping the first time-frequency resource, to transmit more PDCCHs. It should be noted that the resource that is of the DM-RS for the PDSCH and that is indicated by the second frequency domain resource indication information is a resource, in all frequency domain ranges, that is of the DM-RS for the PDSCH and that is indicated by the second frequency domain resource indication information, instead of a resource actually used to transmit the DM-RS for the PDSCH.

For ease of description, in some embodiments, a time-frequency resource that cannot be used to transmit the PDSCH and that cannot overlap the resource that is of the DM-RS for the PDSCH and that is indicated by the second frequency domain resource indication information is referred to as the first-type time-frequency resource. In other words, if the first time-frequency resource cannot overlap the resource that is of the DM-RS for the PDSCH and that is indicated by the second frequency domain resource indication information, the first time-frequency resource belongs to the first-type time-frequency resource. On the contrary, a time-frequency resource that cannot be used to transmit the PDSCH and that overlaps the resource that is of the DM-RS for the PDSCH and that is indicated by the second frequency domain resource indication information is referred to as the second-type time-frequency resource. In other words, if the first time-frequency resource is allowed to overlap the resource that is of the DM-RS for the PDSCH and that is indicated by the second frequency domain resource indication information, and the overlapped resource is not used to transmit the DM-RS for the PDSCH, the first time-frequency resource belongs to the second-type time-frequency resource.

After determining the first time-frequency resource and the second time-frequency resource, the terminal may determine whether the first time-frequency resource overlaps the resource, in the second time-frequency resource, that is of the DM-RS for the PDSCH and that is indicated by the second frequency domain resource indication information, to determine, based on a determining result, whether the first time-frequency resource belongs to the first-type time-frequency resource. If the first time-frequency resource cannot overlap the resource, in the second time-frequency resource, that is of the DM-RS for the PDSCH and that is indicated by the second frequency domain resource indication information, the terminal determines that the first time-frequency resource belongs to the first-type time-frequency resource. On the contrary, if the first time-frequency resource is allowed to overlap the resource, in the second time-frequency resource, that is of the DM-RS for the PDSCH and that is indicated by the second frequency domain resource indication information, and the overlapped resource is not used to transmit the DM-RS for the PDSCH, the terminal may determine that the first time-frequency resource belongs to the second-type time-frequency resource.

In some other embodiments, a time-frequency resource that cannot be used to transmit the PDSCH and that cannot overlap the resource that is of the DM-RS for the PDSCH and that is indicated by the second frequency domain resource indication information, and a time-frequency resource that cannot be used to transmit the PDSCH and that overlaps the resource that is of the DM-RS for the PDSCH and that is indicated by the second frequency domain resource indication information are referred to as the first-type time-frequency resource. In other words, if the first time-frequency resource includes a resource that cannot overlap the resource that is of the DM-RS for the PDSCH and that is indicated by the second frequency domain resource indication information, and a resource that is allowed to overlap the resource that is of the DM-RS for the PDSCH and that is indicated by the second frequency domain resource indication information, the first time-frequency resource belongs to the first-type time-frequency resource. On the contrary, a time-frequency resource that cannot be used to transmit the PDSCH and that overlaps the resource that is of the DM-RS for the PDSCH and that is indicated by the second frequency domain resource indication information is referred to as the second-type time-frequency resource. In other words, if the first time-frequency resource is allowed to overlap the resource that is of the DM-RS for the PDSCH and that is indicated by the second frequency domain resource indication information, and the resource that is allowed to overlap is not used to transmit the DM-RS for the PDSCH, the first time-frequency resource belongs to the second-type time-frequency resource.

The first time-frequency resource may include a resource that overlaps the resource that is of the DM-RS for the PDSCH and that is indicated by the second frequency domain resource indication information, but the resource that overlaps the resource that is of the DM-RS for the PDSCH and that is indicated by the second frequency domain resource indication information may belong to the first-type time-frequency resource or the second-type time-frequency resource. Therefore, the terminal cannot independently determine the resource that overlaps the resource that is of the DM-RS for the PDSCH and that is indicated by the second frequency domain resource indication information may belong to the first-type time-frequency resource or the second-type time-frequency resource. Therefore, the terminal may determine, based on an indication of the base station, that the first time-frequency resource belongs to the first-type time-frequency resource or the second-type time-frequency resource. For example, the base station may send indication information to the terminal, where the indication information may indicate that the first time-frequency resource belongs to the first-type time-frequency resource or the second-type time-frequency resource. The terminal receives the indication information, and determines, based on the indication information, that the first time-frequency resource belongs to the first-type time-frequency resource or the second-type time-frequency resource.

After determining that the first time-frequency resource belongs to the first-type time-frequency resource or the second-type time-frequency resource, the terminal may continue to determine whether to monitor a first downlink control channel candidate overlapping the first time-frequency resource. For example, the following several cases are included.

S604: If the first time-frequency resource belongs to the first-type time-frequency resource, the terminal may determine not to monitor the first downlink control channel candidate.

The first time-frequency resource belongs to the first-type time-frequency resource, that is, the resource that cannot be used to transmit the PDSCH cannot overlap the resource that is of the DM-RS for the PDSCH and that is indicated by the second frequency domain resource indication information. In this case, to reduce complexity of channel estimation of the terminal, the terminal may determine not to monitor the first downlink control channel candidate. For example, the terminal may not monitor all first downlink control channel candidates overlapping the first time-frequency resource.

S605: If the first time-frequency resource belongs to the second-type time-frequency resource, the terminal determines to monitor at least one first downlink control channel candidate.

The first time-frequency resource belongs to the first-type time-frequency resource, that is, the resource that cannot be used to transmit the PDSCH and the DM-RS for the PDSCH can overlap the resource used to transmit the DM-RS for the PDSCH, and the resource that is allowed to overlap is not used to transmit the PDSCH and the DM-RS for the PDSCH. Because the overlapped resource may be used to transmit, for example, a PDCCH, the terminal may determine to monitor the at least one first downlink control channel candidate overlapping the first time-frequency resource, to transmit more PDCCHs.

S606: If the first time-frequency resource belongs to the first-type time-frequency resource, the terminal may determine that a downlink control channel detected on a first downlink control channel candidate is invalid, where S606 is an alternative implementation of S604.

Although the first time-frequency resource belongs to the first-type time-frequency resource, the terminal may monitor the first downlink control channel candidate, and determine that the downlink control channel detected on the first downlink control channel candidate is invalid by default.

S607: If the first time-frequency resource belongs to the second-type time-frequency resource, the terminal may determine that a downlink control channel detected on at least one first downlink control channel candidate is valid, where S607 is an alternative implementation of S605.

When the first time-frequency resource belongs to the second-type time-frequency resource, the terminal may determine to monitor the at least one first downlink control channel candidate, and determine that the downlink control channel detected on the at least one first downlink control channel candidate is valid.

It should be noted that an execution sequence of S604 and S605 is not limited in this embodiment of this application, and either S604 or S606 needs to be performed. Therefore, S606 is shown by using a dashed line in FIG. 6, and is not a necessary step. Similarly, S607 is shown by using a dashed line, and is not a necessary step. It should be understood that if the terminal performs S606, the terminal may not perform S604. Similarly, if the terminal performs S607, the terminal may not perform S605.

In this embodiment of this application, whether to monitor the first downlink control channel candidate overlapping the first time-frequency resource may be determined based on a type of the first time-frequency resource that cannot be used to transmit the PDSCH, to transmit more PDCCHs as much as possible and improve resource usage.

Figure 7:
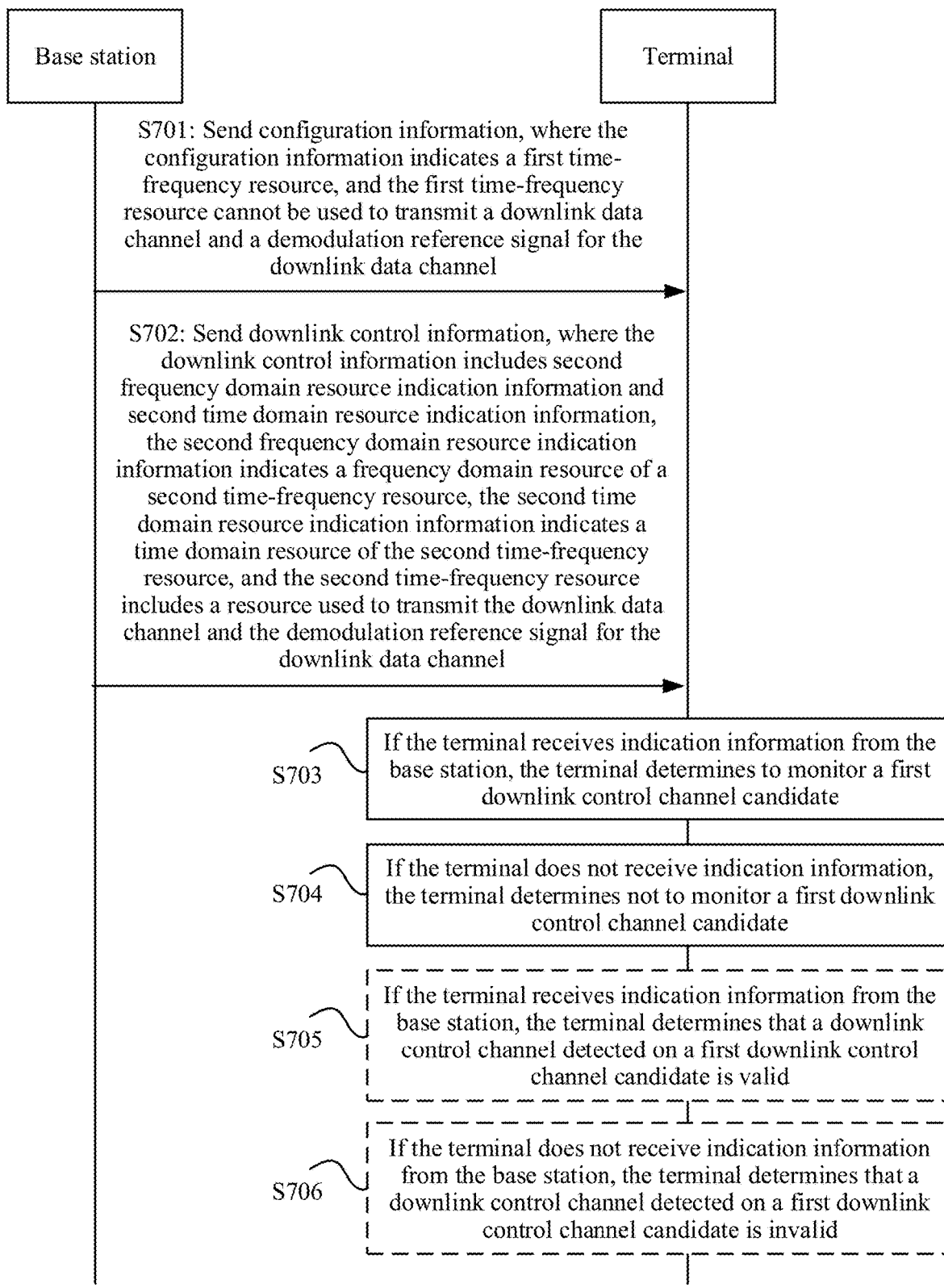
FIG. 7 is a flowchart of an example of a communication method according to an embodiment of this application.

FIG. 7 is a flowchart of an example of a communication method according to an embodiment of this application. The following is described by using an example in which the method is performed by a network device and a terminal, and the network device is a base station. It should be noted that this embodiment of this application is merely described by using a network device and a terminal as an example, and is not limited to the two communication apparatuses.

S701: A base station sends configuration information to a terminal, and the terminal receives the configuration information, where the configuration information indicates a first time-frequency resource, and the first time-frequency resource cannot be used to transmit a downlink data channel and a demodulation reference signal for the downlink data channel.

The base station may configure the first time-frequency resource for the terminal. For details, refer to related descriptions of S501 in FIG. 5. Details are not described herein again. The first time-frequency resource can overlap a DM-RS resource, indicated by downlink control information, of the PDSCH, provided that the overlapped resource does not transmit the DM-RS for the PDSCH. Even the first time-frequency resource overlaps the time-frequency resource, indicated by the downlink control information, of the PDSCH, the terminal may monitor a first downlink control channel candidate overlapping the first time-frequency resource, to transmit more PDCCHs.

In some embodiments, the base station may indicate whether to monitor the first downlink control channel candidate. For example, the base station may send indication information to the terminal, where the indication information indicates to monitor the first downlink control channel candidate.

S702: The base station sends the DCI to the terminal, and the terminal receives the DCI, where the DCI includes second frequency domain resource indication information and second time domain resource indication information, the second frequency domain resource indication information indicates a frequency domain resource of a second time-frequency resource, the second time domain resource indication information indicates a time domain resource of the second time-frequency resource, and the second time-frequency resource includes a resource used to transmit the PDSCH and the DM-RS for the PDSCH.

For details, refer to descriptions in S502. Details are not described herein again.

S703: If the terminal receives the indication information from the base station, the terminal determines to monitor at least one first downlink control channel candidate overlapping the first time-frequency resource.

S704: If the terminal does not receive the indication information, the terminal determines to monitor a first downlink control channel candidate overlapping the first time-frequency resource.

In some other embodiments, the base station may indicate whether a downlink control channel detected on the first downlink control channel candidate is valid. For example, the base station may send the indication information to the terminal, where the indication information indicates whether the downlink control channel detected on the first downlink control channel candidate is valid.

S705: If the terminal receives the indication information from the base station, the terminal determines that the downlink control channel detected on the at least one first downlink control channel candidate overlapping the first time-frequency resource is valid.

S706: If the terminal does not receive the indication information from the base station, the terminal determines that the downlink control channel detected on the at least one first downlink control channel candidate overlapping the first time-frequency resource is invalid.

It should be noted that an execution sequence of S703 and S705 is not limited in this embodiment of this application. Either S703 or S705 needs to be performed. Therefore, S705 is shown by using a dashed line in FIG. 7, and is not a necessary step. Similarly, S706 is shown by using a dashed line, and is not a necessary step. It should be understood that if the terminal performs S707, the terminal may not perform S705. Similarly, if the terminal performs S706, the terminal may not perform S704.

Figure 8:
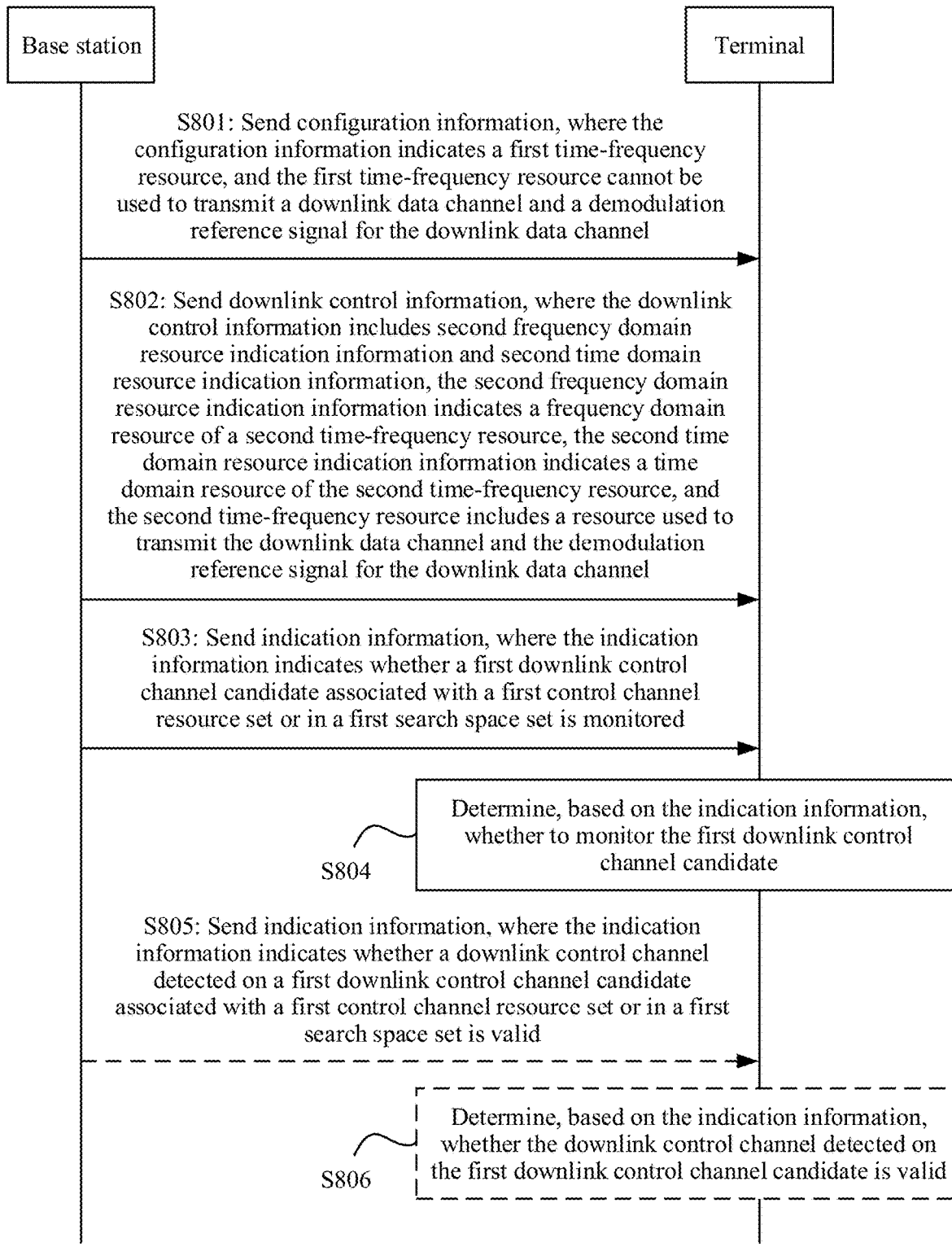
FIG. 8 is a flowchart of an example of a communication method according to an embodiment of this application.

As an alternative implementation of the embodiment shown in FIG. 7, FIG. 8 is a flowchart of another example of a communication method. A procedure is described as follows:

S801: A base station sends configuration information to a terminal, and the terminal receives the configuration information, where the configuration information indicates a first time-frequency resource, and the first time-frequency resource cannot be used to transmit a downlink data channel and a demodulation reference signal for the downlink data channel.

For details, refer to related descriptions of S701 in FIG. 5. Details are not described herein again.

S802: The base station sends the DCI to the terminal, and the terminal receives the DCI, where the DCI includes second frequency domain resource indication information and second time domain resource indication information, the second frequency domain resource indication information indicates a frequency domain resource of a second time-frequency resource, the second time domain resource indication information indicates a time domain resource of the second time-frequency resource, and the second time-frequency resource includes a resource used to transmit the PDSCH and the DM-RS for the PDSCH.

For details, refer to descriptions in S502. Details are not described herein again.

S803: The base station sends indication information to the terminal, and the terminal receives the indication information, where the indication information indicates whether a first downlink control channel candidate associated with a first control channel resource set or in a first search space set is monitored.

The first time-frequency resource may overlap a resource that is of the DM-RS for the PDSCH and that is indicated by the second frequency domain resource indication information. The overlapped resource is not used to transmit the PDSCH and the DM-RS for the PDSCH. In some embodiments, the first time-frequency resource and a resource overlapping the resource that is of the DM-RS for the PDSCH and that is indicated by the second frequency domain resource indication information may be used to send another possible signal, for example, a PDCCH. Therefore, the terminal may monitor a downlink control channel candidate overlapping the first time-frequency resource, to transmit more PDCCHs.

The terminal may determine, based on an indication of the base station, whether to monitor a first downlink control channel candidate, or the base station may indicate whether a downlink control channel detected on a first downlink control channel candidate is valid. For example, the base station may send the indication information to the terminal, where the indication information indicates whether the first downlink control channel candidate is monitored, or the downlink control channel detected on the first downlink control channel candidate is valid.

In some embodiments, the base station may indicate the first downlink control channel candidate based on the first control channel resource set or the first search space set. In other words, the first downlink control channel candidate is a downlink control channel candidate associated with the first control channel resource set, or a downlink control channel candidate in the first search space set.

For example, the indication information may be a bitmap, and occupies one or more bits. For example, a first value of the bitmap indicates that the first downlink control channel candidate associated with the first control channel resource set is monitored, or the first downlink control channel candidate in the first control channel resource set is monitored. A second value of the bitmap indicates that the first downlink control channel candidate associated with the first control channel resource set is not monitored, or the first downlink control channel candidate in the first control channel resource set is not monitored.

S804: The terminal determines, based on the indication information, whether to monitor the first downlink control channel candidate.

The terminal receives the indication information. When a value corresponding to the indication information is the first value, the terminal monitors the first downlink control channel candidate. When a value corresponding to the indication information is the second value, the terminal does not monitor the first downlink control channel candidate.

S805: The base station sends indication information to the terminal, and the terminal receives the indication information, where the indication information indicates whether a downlink control channel detected on a first downlink control channel candidate associated with a first control channel resource set or in a first search space set is valid, and S805 is an alternative implementation of S803.

S805 is similar to S803. The indication information may be a bitmap, a first value of the bitmap indicates whether the downlink control channel detected on the first downlink control channel candidate associated with the first control channel resource set is valid, or the downlink control channel detected on the first downlink control channel candidate in the first search space set is valid. A second value of the bitmap indicates whether the downlink control channel detected on the first downlink control channel candidate associated with the first control channel resource set is invalid, or the downlink control channel detected on the first downlink control channel candidate in the first search space set is invalid.

S806: The terminal determines, based on the indication information, whether the downlink control channel detected on the first downlink control channel candidate is valid.

The terminal receives the indication information. When a value corresponding to the indication information is the first value, the terminal determines that the downlink control channel detected on the first downlink control channel candidate is valid. When a value corresponding to the indication information is the second value, the terminal determines that the downlink control channel detected on the first downlink control channel candidate is invalid.

It should be noted that either S803 or S805 needs to be performed in this embodiment of this application. Similarly, either S804 or S806 needs to be performed. Therefore, S805 and S806 are shown by using dashed lines in FIG. 8. It should be understood that, if S803 and S804 are performed in this embodiment of this application, S805 and S806 are not performed. If S805 and S806 are performed in this embodiment of this application, S803 and S804 are not performed.

In this embodiment of this application, the resource that cannot be used to transmit the PDSCH and the DM-RS for the PDSCH may overlap the resource that is of the DM-RS for the PDSCH and that is indicated by the second frequency domain resource indication information. Therefore, when the resource (namely, the second time-frequency resource) used to transmit the PDSCH and the DM-RS for the PDSCH overlaps the resource (namely, the first time-frequency resource) that cannot be used to transmit the PDSCH and the DM-RS for the PDSCH, a resource, in the second time-frequency resource, on which the PDSCH and the DM-RS for the PDSCH is received, and whether to monitor the downlink control channel candidate overlapping the first time-frequency resource are specified. This can transmit more PDCCHs and improve resource usage.

The foregoing embodiments of this application describe the method provided in embodiments of this application from a perspective of interaction between the terminal and the network device. To implement functions in the foregoing methods provided in embodiments of this application, the terminal and the network device may include a hardware structure and/or a software module, to implement the foregoing functions in a form of the hardware structure, the software module, or a combination of the hardware structure and the software module. Whether a function in the foregoing functions is performed in a form of the hardware structure, the software module, or both the hardware structure and the software module depends on an application and a design constraint condition of the technical solutions.

The following describes a communication apparatus for implementing the foregoing method in embodiments of this application with reference to the accompanying drawings. Therefore, all the foregoing content may be used in the following embodiments. Repeated content is not described again.

Figure 9:
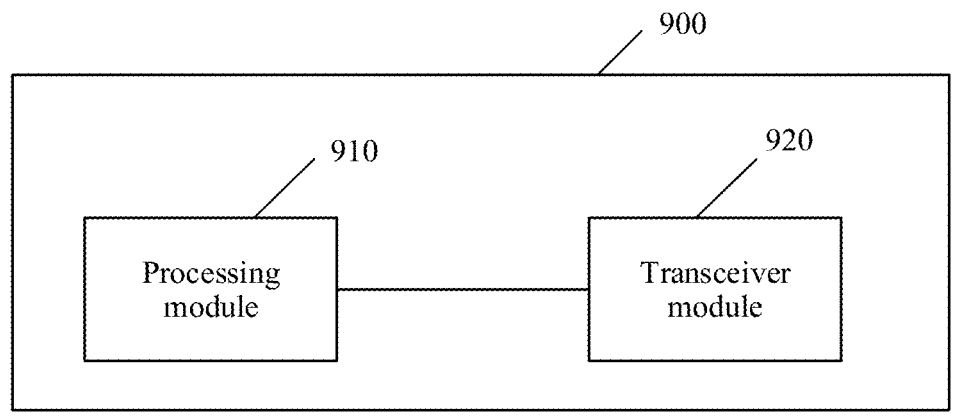
FIG. 9 is a diagram of a communication apparatus according to an embodiment of this application.

FIG. 9 is a diagram of a communication apparatus 900 according to an embodiment of this application. The communication apparatus 900 may correspondingly implement functions or steps of the terminal or the network device in the method embodiments. The communication apparatus may include a processing module 910 and a transceiver module 920. Optionally, the communication apparatus may further include a storage unit. The storage unit may be configured to store instructions (code or a program) and/or data. The processing module 910 and the transceiver module 920 may be coupled to the storage unit. For example, the processing unit 910 may read the instructions (the code or the program) and/or the data in the storage unit, to implement a corresponding method. The foregoing units may be disposed independently, or may be partially or completely integrated. It should be understood that the transceiver module 920 sometimes may also be referred to as a transceiver, a transceiver machine, a transceiver circuit, or the like. The transceiver module 920 may include a receiving module and/or a sending module.

In some implementations, the communication apparatus 900 can correspondingly implement behavior and functions of the terminal in the method embodiments. For example, the communication apparatus 900 may be a terminal, or may be a component (for example, a chip or a circuit) used in the terminal. The transceiver module 920 may be configured to perform all receiving or sending operations performed by the terminal in embodiments described in this specification.

For example, the transceiver module 920 may perform S501 and S502 in the embodiment shown in FIG. 5, and/or support another process of the technology described in this specification. For another example, the transceiver module 920 may perform S601 in the embodiment shown in FIG. 6, and/or support another process of the technology described in this specification. For another example, the transceiver module 920 may perform S701 in the embodiment shown in FIG. 7, and/or support another process of the technology described in this specification. For another example, the transceiver module 920 may perform S801 and S802 or S801 and S804 in the embodiment shown in FIG. 8, and/or support another process of the technology described in this specification.

The processing module 910 is configured to perform all operations performed by the terminal other than sending and receiving operations in the embodiment shown in FIG. 5, FIG. 6, FIG. 7, or FIG. 8. For example, the processing module 910 may be configured to perform S503 and S504 in the embodiment shown in FIG. 5, and/or support another process of the technology described in this specification. For another example, the processing module 910 may be configured to perform S602, S603, and S604 or S602, S605, and S606 in the embodiment shown in FIG. 6, and/or support another process of the technology described in this specification. For another example, the processing module 910 may be configured to perform S702 and S703 or S704 and S705 in the embodiment shown in FIG. 7, and/or support another process of the technology described in this specification. For another example, the processing module 910 may be configured to perform S803 or S805 in the embodiment shown in FIG. 8, and/or support another process of the technology described in this specification.

In some embodiments, the transceiver module 920 is configured to receive configuration information and downlink control information from a network device. The configuration information includes first frequency domain resource indication information, the first frequency domain resource indication information indicates a frequency domain resource of a first time-frequency resource, and the first time-frequency resource cannot be used to transmit a downlink data channel and a demodulation reference signal for the downlink data channel. The downlink control information includes second frequency domain resource indication information and second time domain resource indication information, the second frequency domain resource indication information indicates a frequency domain resource of a second time-frequency resource, the second time domain resource indication information indicates a time domain resource of the second time-frequency resource, and the second time-frequency resource includes a resource used to transmit the downlink data channel and the demodulation reference signal for the downlink data channel.

The processing module 910 is configured to determine that a time domain resource of the first time-frequency resource includes the time domain resource indicated by the second time domain resource indication information.

The transceiver module 920 is further configured to receive, on a portion of or all of a third time-frequency resource, the downlink data channel and the demodulation reference signal for the downlink data channel from the network device. The third time-frequency resource is located in the second time-frequency resource, and the third time-frequency resource does not overlap the first time-frequency resource.

In an optional implementation, the first time-frequency resource overlaps a resource, in the second time-frequency resource, that is of the demodulation reference signal for the downlink data channel and that is indicated by the second frequency domain resource indication information, and the overlapped resource is not used to transmit the downlink data channel and the demodulation reference signal for the downlink data channel.

In an optional implementation, the configuration information further includes a first parameter, and the first parameter indicates a time domain resource. The processing module 910 is further configured to: determine not to monitor a downlink control channel candidate; or determine that a downlink control channel detected on a downlink control channel candidate is invalid. The downlink control channel candidate overlaps a fourth time-frequency resource, a frequency domain resource of the fourth time-frequency resource is a frequency domain resource indicated by a first frequency domain resource, and a time domain resource of the fourth time-frequency resource is the time domain resource indicated by the first parameter.

In an optional implementation, the first time-frequency resource belongs to resources of a group of rate matching patterns, and the resources of a group of rate matching patterns are resources, indicated by the downlink control information, that cannot be used to transmit the downlink data channel.

In an optional implementation, the first time-frequency resource includes a time-frequency resource used to carry a synchronization broadcast block.

In some other embodiments, the transceiver module 920 is configured to receive configuration information from a network device, where the configuration information indicates a first time-frequency resource, and the first time-frequency resource cannot be used to transmit a downlink data channel.

The processing module 910 is configured to: determine that the first time-frequency resource belongs to a first-type time-frequency resource or a second-type time-frequency resource; and if the first time-frequency resource belongs to the first-type time-frequency resource, determine not to monitor a downlink control channel candidate, or determine that a downlink control channel detected on a downlink control channel candidate is invalid, where the downlink control channel candidate overlaps the first time-frequency resource; or if the first time-frequency resource belongs to the second-type time-frequency resource, monitor at least one downlink control channel candidate, or determine that a downlink control channel detected on at least one downlink control channel candidate is valid, where the at least one downlink control channel candidate overlaps the first time-frequency resource.

In an optional implementation, the processing module 910 is configured to:

if it is determined that the first time-frequency resource is not allowed to overlap a resource, in a second time-frequency resource, that is of a demodulation reference signal for the downlink data channel and that is indicated by frequency domain resource indication information, determine that the first time-frequency resource belongs to the first-type time-frequency resource, where the second time-frequency resource includes a resource used to transmit the downlink data channel and the demodulation reference signal for the downlink data channel, a frequency domain resource of the second time-frequency resource is indicated by the frequency domain resource indication information in the downlink control channel, and a time domain resource of the second time-frequency resource is indicated by time domain resource indication information in the downlink control channel.

In an optional implementation, the processing module 910 is configured to:

if the first time-frequency resource is allowed to overlap the resource, in the second time-frequency resource, that is of the demodulation reference signal for the downlink data channel and that is indicated by the frequency domain resource indication information, and the overlapped resource is not used to transmit the demodulation reference signal for the downlink data channel, determine that the first time-frequency resource belongs to the second-type time-frequency resource, where the second time-frequency resource includes a resource used to transmit the downlink data channel and the demodulation reference signal for the downlink data channel, the frequency domain resource of the second time-frequency resource is indicated by the frequency domain resource indication information in the downlink control channel, and the time domain resource of the second time-frequency resource is indicated by the time domain resource indication information in the downlink control channel.

In an optional implementation, the first time-frequency resource is allowed to overlap a resource, in a second time-frequency resource, that is of a demodulation reference signal for the downlink data channel and that is indicated by frequency domain resource indication information, the overlapped resource is not used to transmit the demodulation reference signal for the downlink data channel, and the frequency domain resource indication information indicates a frequency domain resource of the second time-frequency resource. The transceiver module 920 is further configured to:

receive indication information from the network device, where the indication information indicates that the first time-frequency resource belongs to the first-type time-frequency resource or the second-type time-frequency resource.

In an optional implementation, the first time-frequency resource belongs to resources corresponding to a group of rate matching patterns, and the resources corresponding to a group of rate matching patterns are resources, indicated by the downlink control information, that cannot be used to transmit the downlink data channel.

In an optional implementation, the first time-frequency resource includes a time-frequency resource used to carry a synchronization broadcast block.

In some other embodiments, the transceiver module 920 is configured to receive configuration information from a network device, where the configuration information indicates a first time-frequency resource, and the first time-frequency resource cannot be used to transmit a downlink data channel and a demodulation reference signal for the downlink data channel. The processing module 910 is configured to: if indication information from the network device is received, determine to monitor at least one first downlink control channel candidate, or determine that a downlink control channel detected on at least one first downlink control channel candidate is valid, where the at least one first downlink control channel candidate overlaps the first time-frequency resource; or if indication information from the network device is not received, determine not to monitor a first downlink control channel candidate, or determine that a downlink control channel detected on a first downlink control channel candidate is invalid, where the indication information indicates to monitor the first downlink control channel candidate, or that the downlink control channel detected on the first downlink control channel candidate is valid.

In an optional implementation, the first time-frequency resource overlaps a resource, in a second time-frequency resource, that is of the demodulation reference signal for the downlink data channel and that is indicated by frequency domain resource indication information, and the overlapped resource is not used to transmit the downlink data channel and the demodulation reference signal for the downlink data channel. The second time-frequency resource includes a resource used to transmit the downlink data channel and the demodulation reference signal for the downlink data channel, a frequency domain resource of the second time-frequency resource is indicated by the frequency domain resource indication information in the downlink control channel, and a time domain resource of the second time-frequency resource is indicated by time domain resource indication information in the downlink control channel.

In some other embodiments, the transceiver module 920 is configured to receive configuration information and indication information from a network device. The configuration information indicates a first time-frequency resource, the first time-frequency resource cannot be used to transmit a downlink data channel and a demodulation reference signal for the downlink data channel, and the indication information indicates whether a first downlink control channel candidate associated with a first control channel resource set or in a first search space set is monitored. The processing module 910 is configured to determine, based on the indication information, whether to monitor the first downlink control channel candidate, where the first downlink control channel candidate overlaps the first time-frequency resource.

Alternatively, the transceiver module 920 is configured to receive configuration information and indication information from a network device. The configuration information indicates a first time-frequency resource, the first time-frequency resource cannot be used to transmit a downlink data channel and a demodulation reference signal for the downlink data channel, and the indication information indicates whether a downlink control channel detected on a first downlink control channel candidate associated with a first control channel resource set or in a first search space set is valid. The processing module 910 is configured to determine, based on the indication information, whether a first downlink control channel detected on the first downlink control channel candidate is valid, where the first downlink control channel candidate overlaps the first time-frequency resource.

In an optional implementation, the first time-frequency resource overlaps a resource, in a second time-frequency resource, that is of the demodulation reference signal for the downlink data channel and that is indicated by frequency domain resource indication information, and the overlapped resource is not used to transmit the downlink data channel and the demodulation reference signal for the downlink data channel. The second time-frequency resource includes a resource used to transmit the downlink data channel and the demodulation reference signal for the downlink data channel, a frequency domain resource of the second time-frequency resource is indicated by the frequency domain resource indication information in the downlink control channel, and a time domain resource of the second time-frequency resource is indicated by time domain resource indication information in the downlink control channel.

It should be understood that the processing module 910 in this embodiment of this application may be implemented by a processor or a processor-related circuit component, and the transceiver module 920 may be implemented by a transceiver, a transceiver-related circuit component, or a communication interface.

In some implementations, the communication apparatus 900 can correspondingly implement behavior and functions of the network device in the method embodiments. For example, the communication apparatus 900 may be a network device, or may be a component (for example, a chip or a circuit) used in the network device. The transceiver module 920 may be configured to perform all receiving or sending operations performed by the network device in the embodiment shown in FIG. 5, FIG. 6, FIG. 7, or FIG. 8. For example, the transceiver module 920 may perform S501 and S502 in the embodiment shown in FIG. 5, and/or support another process of the technology described in this specification. For example, the transceiver module 920 may perform S601 in the embodiment shown in FIG. 6, and/or support another process of the technology described in this specification. For example, the transceiver module 920 may perform S701 in the embodiment shown in FIG. 7, and/or support another process of the technology described in this specification. For example, the transceiver module 920 may perform S801 and S802 or S801 and S804 in the embodiment shown in FIG. 8, and/or support another process of the technology described in this specification. The processing module 910 is configured to perform all operations performed by the network device other than sending and receiving operations in the embodiment shown in FIG. 5, FIG. 6, FIG. 7, or FIG. 8, and/or support another process of the technology described in this specification.

In some embodiments, the transceiver module 920 is configured to send configuration information to a terminal, where the configuration information indicates a first time-frequency resource, and the first time-frequency resource cannot be used to transmit a downlink data channel. The processing module 910 is configured to determine that the first time-frequency resource belongs to a first-type time-frequency resource or a second-type time-frequency resource, where the first time-frequency resource is allowed to overlap a resource, in a second time-frequency resource, that is of a demodulation reference signal for the downlink data channel and that is indicated by frequency domain resource indication information, the resource that is allowed to overlap is not used to transmit the demodulation reference signal for the downlink data channel, the second time-frequency resource includes a resource used to transmit the downlink data channel and the demodulation reference signal for the downlink data channel, a frequency domain resource of the second time-frequency resource is indicated by the frequency domain resource indication information in a downlink control channel, and a time domain resource of the second time-frequency resource is indicated by time domain resource indication information in the downlink control channel. The transceiver module 920 is further configured to send indication information to the terminal, where the indication information indicates that the first time-frequency resource belongs to the first-type time-frequency resource or the second-type time-frequency resource.

It should be understood that, if the first time-frequency resource belongs to the first-type time-frequency resource, the transceiver module 920 does not send the downlink control channel on a downlink control channel candidate. If the first time-frequency resource belongs to the second-type time-frequency resource, the transceiver module 920 may send the downlink control channel on a downlink control channel candidate, where the downlink control channel candidate overlaps the first time-frequency resource.

In an optional implementation, the first time-frequency resource does not overlap the resource, in the second time-frequency resource, that is used to transmit the demodulation reference signal for the downlink data channel, and the first time-frequency resource belongs to the first-type time-frequency resource.

The first time-frequency resource overlaps the resource, in the second time-frequency resource, that is used to transmit the demodulation reference signal for the downlink data channel, the overlapped resource is not used to transmit the demodulation reference signal for the downlink data channel, and the first time-frequency resource belongs to the second-type time-frequency resource.

It should be understood that the processing module 910 in this embodiment of this application may be implemented by a processor or a processor-related circuit component, and the transceiver module 920 may be implemented by a transceiver, a transceiver-related circuit component, or a communication interface.

Figure 10:
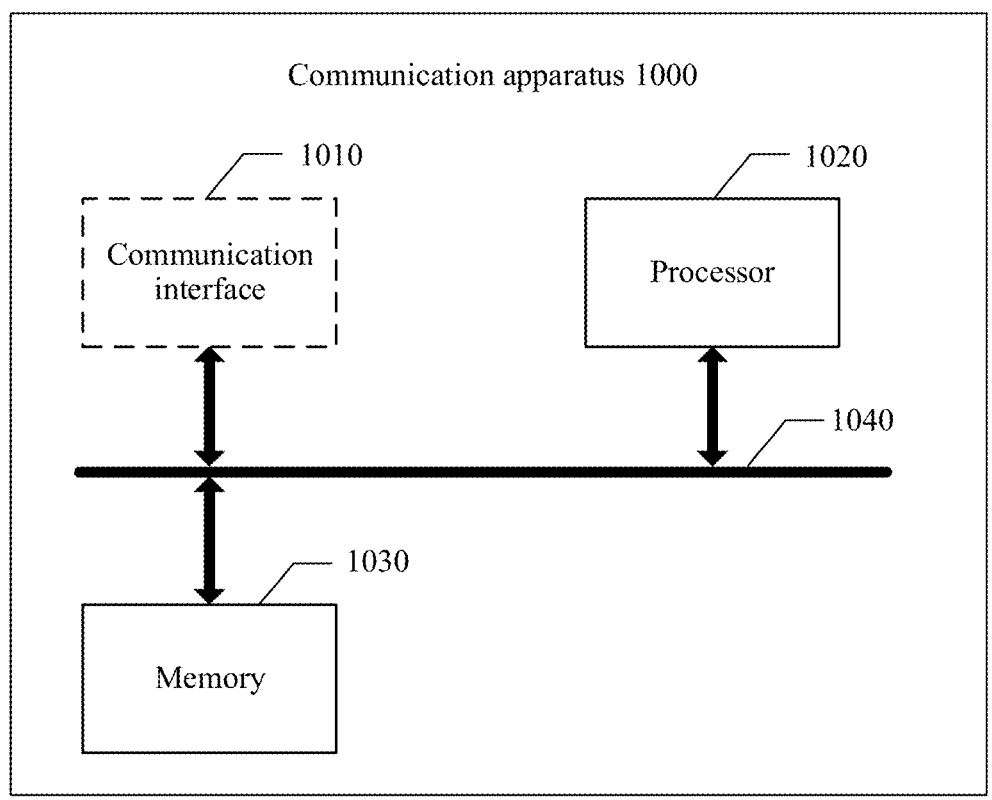
FIG. 10 is a diagram of a communication apparatus according to an embodiment of this application.

FIG. 10 shows a communication apparatus 1000 according to an embodiment of this application. The communication apparatus 1000 may be a terminal, and can implement functions of the terminal in the method provided in embodiments of this application. Alternatively, the communication apparatus 1000 may be a network device, and can implement functions of the network device in the method provided in embodiments of this application. Alternatively, the communication apparatus 1000 may be an apparatus that can support the terminal to implement corresponding functions in the method provided in embodiments of this application, or an apparatus that can support the network device to implement corresponding functions in the method provided in embodiments of this application. The communication apparatus 1000 may be a chip system. In embodiments of this application, the chip system may include a chip, or may include a chip and another discrete component.

In hardware implementation, the transceiver module 920 may be a transceiver, and the transceiver is integrated into the communication apparatus 1000, to form a communication interface 1010.

The communication apparatus 1000 includes at least one processor 1020, configured to implement or support the communication apparatus 1000 to implement the functions of the network device or the terminal in the method provided in embodiments of this application. For details, refer to detailed descriptions in the method example. Details are not described herein again.

The communication apparatus 1000 may further include at least one memory 1030, configured to store program instructions and/or data. The memory 1030 is coupled to the processor 1020. The coupling in this embodiment of this application may be an indirect coupling or a communication connection between apparatuses, units, or modules in an electrical form, a mechanical form, or another form, and is used for information exchange between the apparatuses, the units, or the modules. The processor 1020 may operate with the memory 1030. The processor 1020 may execute the program instructions and/or the data stored in the memory 1030, so that the communication apparatus 1000 implements corresponding methods. At least one of the at least one memory may be included in the processor.

The communication apparatus 1000 may further include the communication interface 1010, configured to communicate with another device by using a transmission medium, so that an apparatus used in the communication apparatus 1000 can communicate with the another device. For example, when the communication apparatus is a terminal, the another device is a network device. Alternatively, when the communication apparatus is a network device, the another device is a terminal. The processor 1020 may send and receive data through the communication interface 1010. The communication interface 1010 may be a transceiver.

A connection medium between the communication interface 1010, the processor 1020, and the memory 1030 is not limited in this embodiment of this application. In this embodiment of this application, the memory 1030, the processor 1020, and the communication interface 1010 are connected to each other through a bus 1040 in FIG. 10. The bus is represented by using a thick line in FIG. 10. A connection manner between other components is only an example for descriptions, and is not limited thereto. The bus may be classified into an address bus, a data bus, a control bus, or the like. For ease of representation, only one thick line is for representing the bus in FIG. 10, but this does not mean that there is only one bus or only one type of bus.

In this embodiment of this application, the processor 1020 may be a general-purpose processor, a digital signal processor, an application-specific integrated circuit, a field programmable gate array or another programmable logic device, a discrete gate or transistor logic device, or a discrete hardware component, and can implement or perform the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module.

In embodiments of this application, the memory 1030 may be a non-volatile memory, such as a hard disk drive (HDD) or a solid-state drive (SSD), or may be a volatile memory, such as a random access memory (RAM). The memory is any other medium that can be used to carry or store expected program code in a form of an instruction or a data structure and that can be accessed by a computer. However, this is not limited thereto. The memory in embodiments of this application may alternatively be a circuit or any other apparatus that can implement a storage function, and is configured to store the program instructions and/or the data.

It should be noted that the communication apparatus in the foregoing embodiment may be a terminal, a circuit, a chip applied to a terminal, or another combined component, component, or the like that has a function of the terminal. When the communication apparatus is a terminal, the transceiver module may be a transceiver, and may include an antenna, a radio frequency circuit, and the like. The processing module may be a processor, for example, a central processing unit (CPU). When the communication apparatus is a component that has a function of the terminal, the transceiver module may be a radio frequency unit, and the processing module may be a processor. When the communication apparatus is a chip system, the transceiver module may be an input/output interface of the chip system, and the processing module may be a processor of the chip system.

Figure 11:
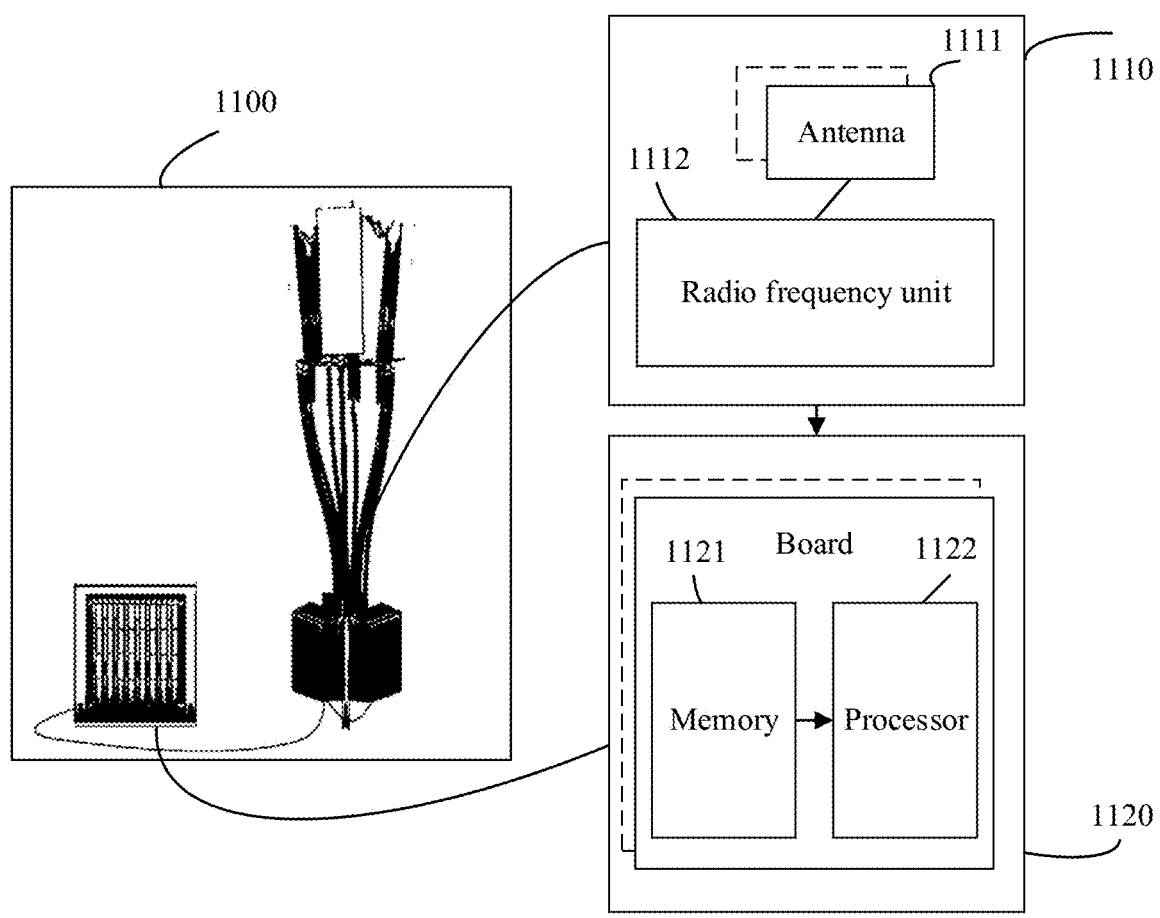
FIG. 11 is a diagram of a communication apparatus according to an embodiment of this application.

FIG. 11 is a diagram of a structure of a communication apparatus. For ease of understanding and ease of illustration, in FIG. 11, an example in which the communication apparatus is a base station is used. The base station may be applied to the system shown in FIG. 1, may be the network device in FIG. 1, and performs functions of the network device in the method embodiments.

A communication apparatus 1100 includes a transceiver 1110, a memory 1121, and a processor 1122. The transceiver 1110 may be used by the communication apparatus for communication, for example, configured to send or receive the configuration information and the downlink control information. The memory 1121 is coupled to the processor

1122, and may be configured to store a program and data that are necessary for the communication apparatus 1100 to implement functions. The processor 1122 is configured to support the communication apparatus 1100 to perform corresponding functions in the method. The functions may be implemented by invoking the program stored in the memory 1121.

The transceiver 1110 may be a wireless transceiver, and may be configured to support the communication apparatus 1100 to receive and send signaling and/or data through a radio air interface. The transceiver 1110 may also be referred to as a transceiver unit or a communication unit. The transceiver 1110 may include a radio frequency unit 1112 and one or more antennas 1111. The radio frequency unit is, for example, a remote radio unit (RRU), and may be configured to transmit a radio frequency signal and perform conversion between a radio frequency signal and a baseband signal. The one or more antennas may be configured to radiate and receive a radio frequency signal. Optionally, the transceiver 1110 may include only the radio frequency unit, and the communication apparatus 1100 may include the transceiver 1110, the memory 1121, the processor 1122, and the antenna.

The memory 1121 and the processor 1122 may be integrated or may be independent of each other. As shown in FIG. 11, the memory 1121 and the processor 1122 may be integrated into a control unit 1100 of the communication apparatus 1100. For example, the control unit 1100 may include a baseband unit (BBU) of an LTE base station, and the baseband unit may also be referred to as a digital unit (DU). Alternatively, the control unit 1100 may include a distributed unit (DU) and/or a centralized unit (CU) in a base station in 5G and future radio access technologies. The control unit 1100 may include one or more antenna panels. A plurality of antenna panels may jointly support a radio access network (for example, an LTE network) of a single access standard, or may separately support radio access networks (for example, an LTE network, a 5G network, or another network) of different access standards. The memory 1121 and the processor 1122 may serve one or more antenna panels. In other words, the memory 1121 and the processor 1122 may be separately disposed on each antenna panel. Alternatively, the plurality of antenna panels may share a same memory 1121 and a same processor 1122. In addition, a necessary circuit may be disposed on each antenna panel. For example, the circuit may be configured to implement coupling between the memory 1121 and the processor 1122. The transceiver 1110, the processor 1122, and the memory 1121 may be connected by using a bus structure and/or another connection medium.

On the basis of the structure shown in FIG. 11, when the communication apparatus 1100 needs to send data, the processor 1122 may perform baseband processing on to-be-sent data, and outputs a baseband signal to the radio frequency unit. The radio frequency unit performs radio frequency processing on the baseband signal, and then sends a radio frequency signal in a form of an electromagnetic wave through the antenna. When data is sent to the communication apparatus 1100, the radio frequency unit receives the radio frequency signal through the antenna, converts the radio frequency signal into a baseband signal, and outputs the baseband signal to the processor 1103. The processor 1122 converts the baseband signal into data and processes the data.

Based on the structure shown in FIG. 11, the transceiver 1110 may be configured to perform the steps performed by the communication module 601, and/or the processor 1122 may be configured to invoke instructions in the memory 1121, to perform the steps performed by the processing module 602.

Figure 12:
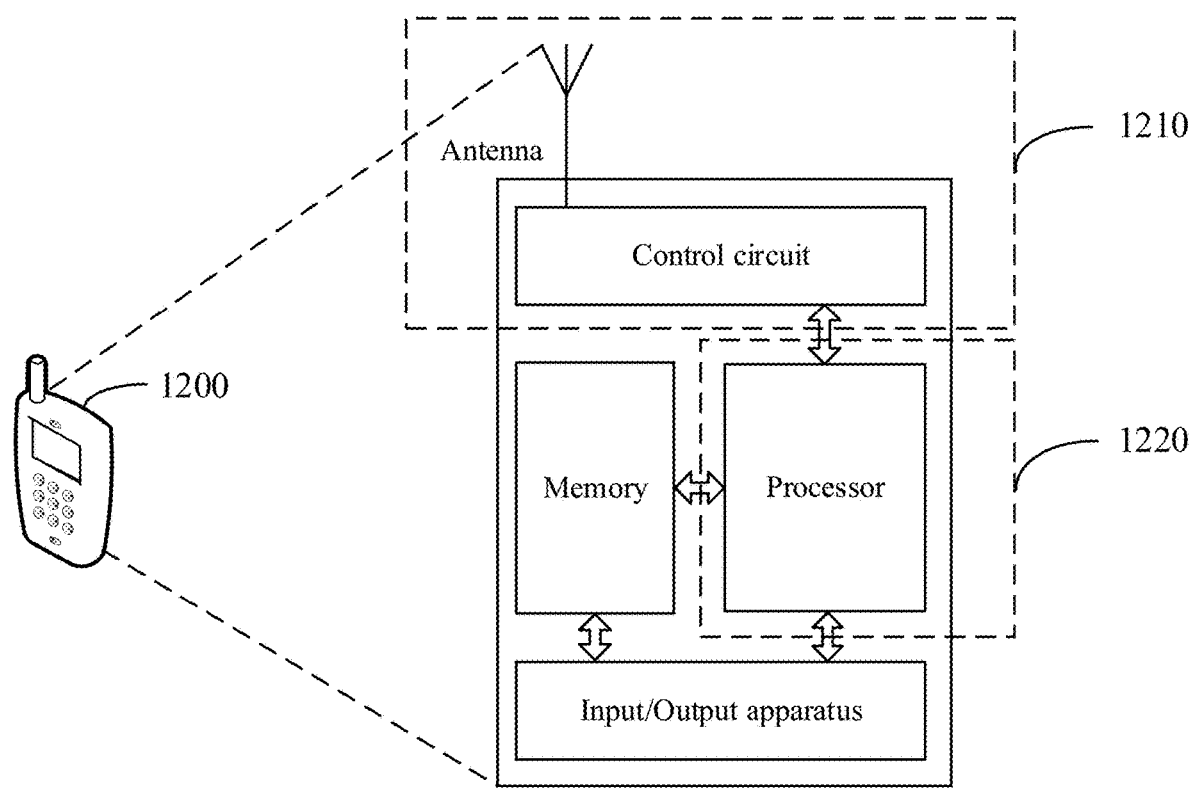
FIG. 12 is a diagram of another communication apparatus according to an embodiment of this application.

FIG. 12 is a diagram of a structure of a terminal. For ease of understanding and illustration, in FIG. 12, an example in which the terminal is a mobile phone is used. As shown in FIG. 12, the terminal includes a processor, a memory, a radio frequency circuit, an antenna, and an input/output apparatus. The processor is mainly configured to: process a communication protocol and communication data, control an on-board unit, execute a software program, and process data of the software program. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, for example, a touchscreen, a display screen, or a keyboard, is mainly configured to: receive data entered by a user, and output data to the user. It should be noted that some types of devices may have no input/output apparatus.

When data needs to be sent, the processor performs baseband processing on to-be-sent data, and outputs a baseband signal to the radio frequency circuit. The radio frequency circuit performs radio frequency processing on the baseband signal, and then sends a radio frequency signal to the outside in a form of an electromagnetic wave through the antenna. When data is sent to the device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 12 shows only one memory and one processor. In an actual device product, there may be one or more processors and one or more memories. The memory may also be referred to as a storage medium, a storage device, or the like. The memory may be disposed independently of the processor, or may be integrated with the processor. This is not limited in embodiments of this application.

In this embodiment of this application, the antenna and the radio frequency circuit that have receiving and sending functions may be considered as a transceiver unit of the apparatus, and the processor having a processing function may be considered as a processing unit of the apparatus. As shown in FIG. 12, the apparatus includes a transceiver unit 1210 and a processing unit 1220. The transceiver unit 1210 may also be referred to as a transceiver machine, a transceiver, a transceiver apparatus, or the like. The processing unit 1220 may also be referred to as a processor, a processing board, a processing module, a processing apparatus, or the like. Optionally, a component that is in the transceiver unit 1210 and that is configured to implement a receiving function may be considered as a receiving unit, and a component that is in the transceiver unit 1210 and that is configured to implement a sending function may be considered as a sending unit. In other words, the transceiver unit 1210 includes the receiving unit and the sending unit. The transceiver unit 1210 sometimes may also be referred to as a transceiver, a transceiver machine, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 1210 is configured to perform a sending operation and a receiving operation on a terminal side in the method embodiments, and the processing unit 1220 is configured to perform an operation other than the receiving and sending operations of the terminal in the method embodiments.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

Figure 13:
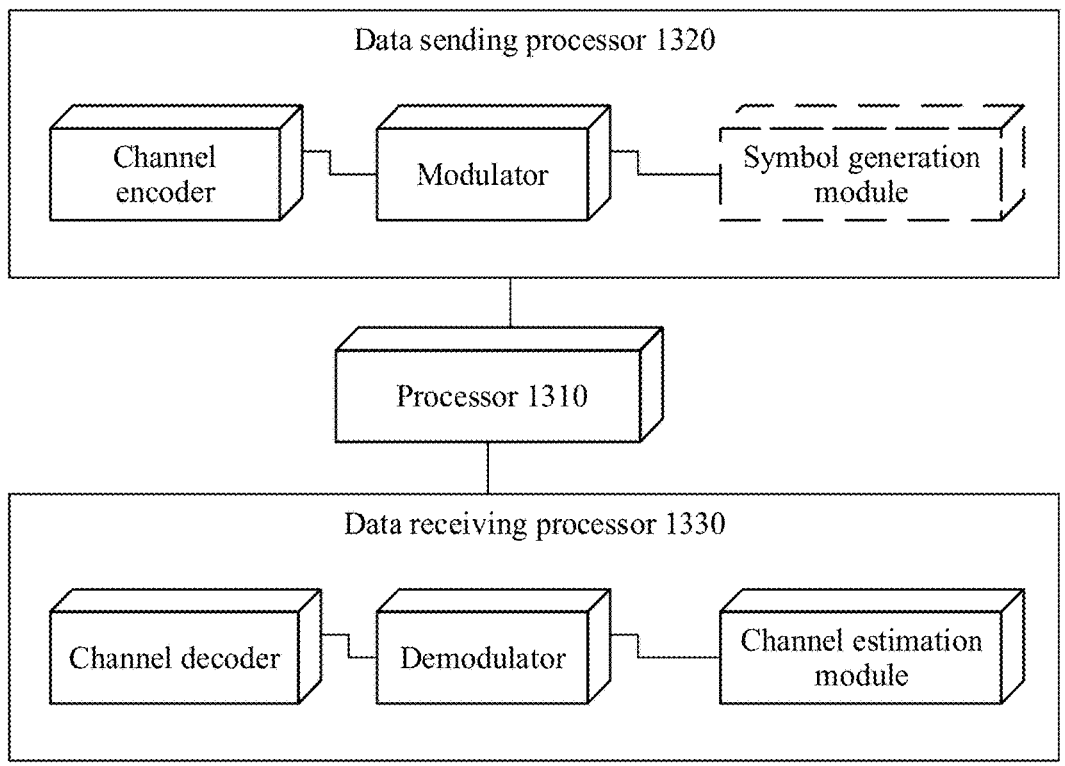
FIG. 13 is a diagram of another communication apparatus according to an embodiment of this application.

In this embodiment, refer to an apparatus shown in FIG. 13. In an example, the apparatus may complete a function similar to that of the processing module 910 in FIG. 9. In FIG. 13, the apparatus includes a processor 1310, a data sending processor 1320, and a data receiving processor 1330. The processing module 910 in the embodiment may be the processor 1310 in FIG. 13, and implements a corresponding function. The processing module 910 in the embodiment may be the data sending processor 1320, and/or the data receiving processor 1330 in FIG. 13. Although FIG. 13 shows a channel encoder and a channel decoder, it may be understood that these modules are only examples, and do not constitute a limitation on this embodiment.

Figure 14:
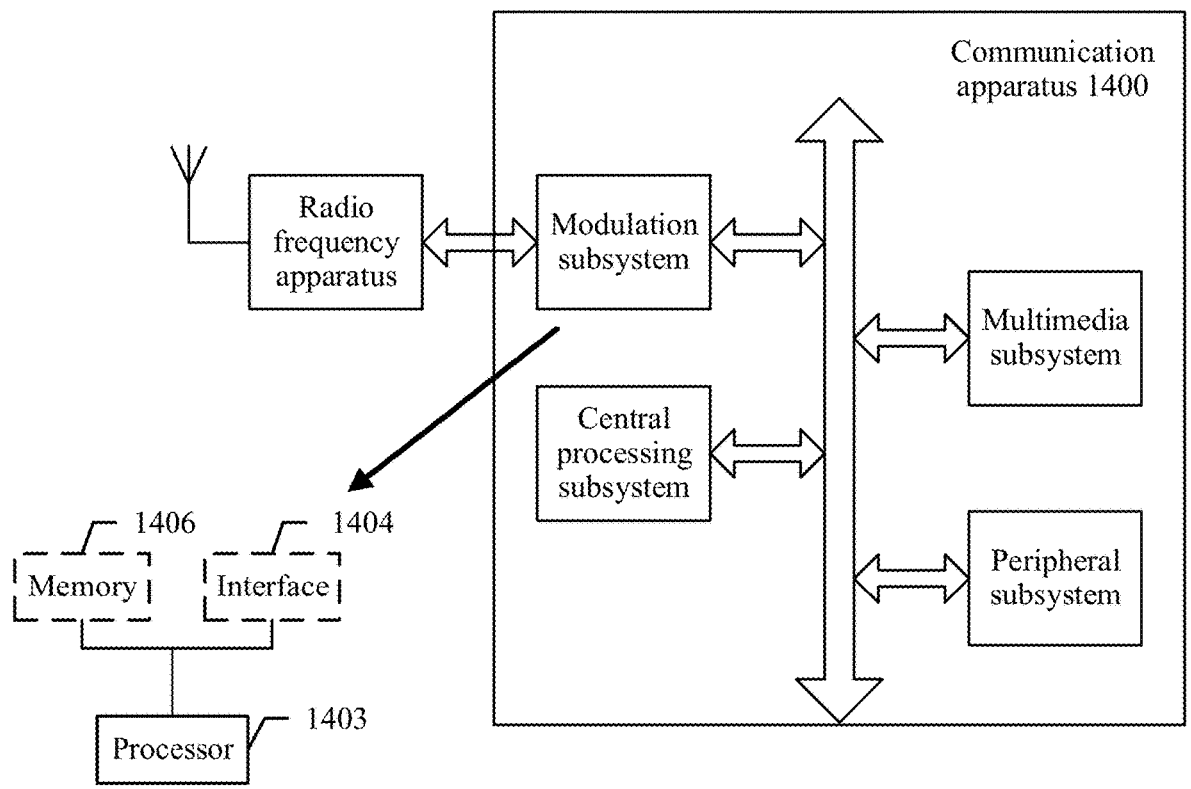
FIG. 14 is a diagram of another communication apparatus according to an embodiment of this application.

FIG. 14 shows another form of this embodiment. A communication apparatus 1400 includes modules such as a modulation subsystem, a central processing subsystem, and a peripheral subsystem. The communication apparatus in this embodiment may be used as the modulation subsystem. The modulation subsystem may include a processor 1403 and an interface 1404. The processor 1403 completes a function of the foregoing processing module 910, and the interface 1404 completes a function of the transceiver module 920. In another variation, the modulation subsystem includes a memory 1406, a processor 1403, and a program that is stored in the memory 1406 and that can be run on the processor. When executing the program, the processor 1403 implements the method of the terminal in the method embodiment. It should be noted that the memory 1406 may be nonvolatile or volatile, and may be located inside the modulation subsystem, or may be located in the processing apparatus 1400, provided that the memory 1406 can be connected to the processor 1403.

An embodiment of this application further provides a communication system. The communication system includes a network device and a terminal device, or may include a plurality of network devices and a plurality of terminals. For example, the communication system includes a network device and a terminal that are configured to implement related functions in FIG. 5, FIG. 6, FIG. 7, or FIG. 8.

The network device is separately configured to implement functions of the network device related to FIG. 5, FIG. 6, FIG. 7, or FIG. 8. The terminal is configured to implement functions of the terminal related to FIG. 5, FIG. 6, FIG. 7, or FIG. 8. For details, refer to the related descriptions in the method embodiment. Details are not described herein again.

An embodiment of this application further provides a computer-readable storage medium including instructions. When the computer-readable storage medium is run on a computer, the computer is enabled to perform the method performed by the network device in the embodiments shown in FIG. 5, FIG. 6, FIG. 7, or FIG. 8, or the method performed by the terminal in the embodiments shown in FIG. 5, FIG. 6, FIG. 7, or FIG. 8.

An embodiment of this application further provides a computer program product including instructions. When the computer program product is run on a computer, the computer is enabled to perform the method performed by the network device in the embodiments shown in FIG. 5, FIG. 6, FIG. 7, or FIG. 8, or the method performed by the terminal in the embodiments shown in FIG. 5, FIG. 6, FIG. 7, or FIG. 8.

An embodiment of this application provides a chip system. The chip system includes a processor and may further include a memory. The chip system is configured to implement functions of the network device or the terminal in the method. The chip system may include a chip, or may include a chip and another discrete component.

It should be noted that the terms "system" and "network" may be used interchangeably in embodiments of this application. "A plurality of" means two or more. In view of this, "a plurality of" may also be understood as "at least two" in embodiments of this application. "At least one" may be understood as one or more, for example, one, two, or more. For example, "including at least one" means including one, two, or more, and does not limit which items are included. For example, if at least one of A, B, and C is included, A, B, C, A and B, A and C, B and C, or A, B, and C may be included. Similarly, understanding of descriptions such as "at least one type" is similar. The term "and/or" describes an association relationship for describing associated objects and represents that three relationships may exist. For example, A and/or B may represent the following three cases: Only A exists, both A and B exist, and only B exists. In addition, the character "/", unless otherwise specified, usually indicates an "or" relationship between the associated objects.

In addition, unless otherwise stated, ordinal numbers such as "first" and "second" in embodiments of this application are used to distinguish between a plurality of objects, but are not intended to limit a sequence, a time sequence, priorities, or importance of the plurality of objects. In addition, descriptions of "first" and "second" does not necessarily indicate that objects are different.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with illustrative logical blocks described in embodiments disclosed in this specification and steps may be implemented by electronic hardware or a combination of computer software and electronic hardware. Whether the functions are executed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   receiving configuration information from a network device, wherein the configuration information indicates a first time-frequency resource, and the first time-frequency resource cannot be used to transmit a downlink data channel and a demodulation reference signal for the downlink data channel; and
   if indication information is received from the network device, determining to monitor at least one first downlink control channel candidate, wherein the at least one first downlink control channel candidate overlaps the first time-frequency resource; or
   if the indication information is not received from the network device, determining not to monitor a first downlink control channel candidate, wherein the first downlink control channel candidate overlaps the first time-frequency resource;
   wherein the indication information indicates to monitor the first downlink control channel candidate.

2. The communication method of claim 1, wherein the receiving and determining steps are performed by a terminal or a chip system for the terminal.

3. The communication method of claim 1, wherein the first time-frequency resource belongs to a group of rate matching pattern resources, and wherein the group of rate matching pattern resources are resources indicated by the downlink control information that cannot transmit the downlink data channel.

4. The communication method of claim 1, wherein the first time-frequency resource includes a time-frequency resource for carrying a synchronous broadcast block.

5. The communication method of claim 1, wherein if the first time-frequency resource is allowed to overlap with the demodulation reference signal of the downlink data channel indicated by a frequency domain resource indication information in a second time-frequency resource, and the resources allowed to overlap are not used to transmit the demodulation reference signal of the downlink data channel, determining that the first time-frequency resource belongs to a second type of time-frequency resource.

6. The communication method of claim 1, wherein a second frequency domain resource of a second time-frequency resource is indicated by a second frequency domain resource indication information in the downlink control channel, and a second time domain resource of the second time-frequency resource is indicated by a time domain resource indication information in the downlink control channel.

7. The communication method of claim 1, wherein the indication information indicates the first time-frequency resource is a first type of time-frequency resource or a second type of time-frequency resource.

8. The communication method of claim 1, wherein the first time-frequency resource belongs to a group of resources corresponding to rate matching patterns, and wherein the resources corresponding to the group of rate matching patterns are resources that cannot transmit the downlink data channel indicated by the downlink control information.

9. An apparatus comprising:
   a memory storing instructions; and
   at least one processor in communication with the memory, the at least one processor configured, upon execution of the instructions, to perform the following:
   receiving configuration information from a network device, wherein the configuration information indicates a first time-frequency resource, and the first time-frequency resource cannot be used to transmit a downlink data channel and a demodulation reference signal for the downlink data channel; and
   if indication information is received from the network device, determining to monitor at least one first downlink control channel candidate, wherein the at least one first downlink control channel candidate overlaps the first time-frequency resource; or
   if the indication information is not received from the network device, determining not to monitor a first downlink control channel candidate, wherein the first downlink control channel candidate overlaps the first time-frequency resource;
   wherein the indication information indicates to monitor the first downlink control channel candidate.

10. The apparatus of claim 9, wherein the apparatus comprises a terminal or a chip system for the terminal.

11. The apparatus of claim 9, wherein the first time-frequency resource belongs to a group of rate matching pattern resources, and wherein the group of rate matching pattern resources are resources indicated by the downlink control information that cannot transmit the downlink data channel.

12. The apparatus of claim 9, wherein the first time-frequency resource includes a time-frequency resource for carrying a synchronous broadcast block.

13. The apparatus of claim 9, wherein if the first time-frequency resource is allowed to overlap with the demodulation reference signal of the downlink data channel indicated by a frequency domain resource indication information in a second time-frequency resource, and the resources allowed to overlap are not used to transmit the demodulation reference signal of the downlink data channel, determining that the first time-frequency resource belongs to a second type of time-frequency resource.

14. The apparatus of claim 9, wherein a second frequency domain resource of a second time-frequency resource is indicated by a second frequency domain resource indication information in the downlink control channel, and a second time domain resource of the second time-frequency resource is indicated by a time domain resource indication information in the downlink control channel.

15. An apparatus comprising:
a memory storing instructions; and
at least one processor in communication with the memory, the at least one processor configured, upon execution of the instructions, to perform the following:
sending configuration information indicating a first time-frequency resource, and the first time-frequency resource cannot be used to transmit a downlink data channel and a demodulation reference signal for the downlink data channel; and
sending indication information indicating to monitor at least one first downlink control channel candidate, wherein the at least one first downlink control channel candidate overlaps the first time-frequency resource.

16. The apparatus of claim 15, wherein the apparatus comprises a chip system for the network device.

17. The apparatus of claim 15, wherein the apparatus comprises a base station.

18. The apparatus of claim 15, wherein the at least one processor further executes the instructions to determine that the first time-frequency resource belongs to a first type of time-frequency resource or a second type of time-frequency resource.

19. The apparatus of claim 15, wherein the indication information indicates that the first time-frequency resource is a first-type time-frequency resource or a second-type time-frequency resource.

20. The apparatus of claim 15, wherein if the first time-frequency resource is a first-type time-frequency resource, determine not to send a downlink control channel on the at least one downlink control channel candidate, wherein the at least one downlink control channel candidate overlaps with the first time-frequency resource.

* * * * *